(12) United States Patent
Miya

(10) Patent No.: US 11,762,176 B2
(45) Date of Patent: Sep. 19, 2023

(54) PROJECTION OPTICAL SYSTEM AND IMAGE PROJECTION APPARATUS

(71) Applicant: Kenji Miya, Iwate (JP)

(72) Inventor: Kenji Miya, Iwate (JP)

(73) Assignee: RICOH INDUSTRIAL SOLUTIONS INC., Kanagawa (JP)

( * ) Notice: Subject to any disclaimer, the term of this patent is extended or adjusted under 35 U.S.C. 154(b) by 113 days.

(21) Appl. No.: 17/497,044

(22) Filed: Oct. 8, 2021

(65) Prior Publication Data

US 2022/0113518 A1 Apr. 14, 2022

(30) Foreign Application Priority Data

Oct. 12, 2020 (JP) ................. 2020-171907

(51) Int. Cl.
| | |
|---|---|
| *G02B 13/16* | (2006.01) |
| *G02B 13/18* | (2006.01) |
| *G02B 9/04* | (2006.01) |
| *G03B 21/28* | (2006.01) |

(52) U.S. Cl.
CPC ............. *G02B 13/16* (2013.01); *G02B 9/04* (2013.01); *G02B 13/18* (2013.01); *G03B 21/28* (2013.01)

(58) Field of Classification Search
CPC ...... G03B 21/008; G03B 21/28; G03B 21/30; G03B 21/145; G03B 21/208; G03B 21/2066; H04N 9/315; H04N 9/3102; H04N 9/3132; H04N 9/3141; H04N 9/3152; G02B 9/04; G02B 9/06; G02B 9/10; G02B 9/14; G02B 9/36; G02B 13/16; G02B 13/18; G02B 13/22; G02B 13/26

See application file for complete search history.

(56) References Cited

U.S. PATENT DOCUMENTS

| | | | |
|---|---|---|---|
| 8,014,075 | B2 | 9/2011 | Minefuji |
| 9,372,388 | B2 | 6/2016 | Matsuo |
| 9,785,043 | B2 | 10/2017 | Matsuo |
| 10,451,962 | B2 | 10/2019 | Amano |
| 11,073,749 | B2 * | 7/2021 | Yanagisawa ....... G02B 17/0856 |

(Continued)

FOREIGN PATENT DOCUMENTS

| | | |
|---|---|---|
| JP | 4396769 | 1/2010 |
| JP | 2013-33283 | 2/2013 |

(Continued)

*Primary Examiner* — Sultan Chowdhury
(74) *Attorney, Agent, or Firm* — IPUSA, PLLC

(57) ABSTRACT

A projection optical system includes a first refractive system, a reflective optical system, and a second refractive system, disposed in the stated order in a direction from the reduction side toward the enlargement side, to enlarge and project an image displayed on an image display element, onto a projection surface. A first lens group of the first refractive system forms a first intermediate image with a light beam from the image display element. A second lens group of the first refractive system forms a second intermediate image with a light beam from the first intermediate image. A light beam from the second intermediate image is reflected by the reflective optical system and is then refracted by the second refractive system. A condition (1): $1.5<Bf/f<25$ is satisfied, in which f represents a focal length of the entire projection optical system and Bf represents a back focus obtained by air conversion.

11 Claims, 30 Drawing Sheets

(56) References Cited

U.S. PATENT DOCUMENTS

| | | | | |
|---|---|---|---|---|
| 2009/0066919 | A1* | 3/2009 | Fujita | G03B 21/28 |
| | | | | 353/98 |
| 2019/0285979 | A1* | 9/2019 | Takano | G03B 21/142 |
| 2019/0331901 | A1* | 10/2019 | Minefuji | G02B 17/08 |
| 2020/0142291 | A1* | 5/2020 | Nishikawa | G02B 17/0828 |
| 2021/0003913 | A1* | 1/2021 | Masui | G03B 21/14 |

FOREIGN PATENT DOCUMENTS

| | | |
|---|---|---|
| JP | 5145486 | 2/2013 |
| JP | 2014-080509 | 5/2014 |
| JP | 2019-35873 | 3/2019 |
| WO | 2014/103324 | 7/2014 |

* cited by examiner

FIG.8

| i | R | | D | j | Nd | νd |
|---|---|---|---|---|---|---|
| 0 | ∞ | | 0.000 | | | |
| 1 | ∞ | | 8.000 | | | |
| 2 | ∞ | | 26.000 | PR | 1.51680 | 64.2 |
| 3 | ∞ | | 1.000 | | | |
| 4 | 62.1175 | | 5.947 | 1 | 1.94595 | 18.0 |
| 5 | −171.8347 | | 31.047 | | | |
| 6 | 95.7666 | | 6.000 | 2 | 1.49700 | 81.6 |
| 7 | −22.5848 | | 0.340 | | | |
| 8 | −21.9346 | | 1.200 | 3 | 1.94595 | 18.0 |
| 9 | −47.4697 | | 2.016 | | | |
| 10 | 281.5924 | | 2.574 | 4 | 1.49700 | 81.6 |
| 11 | −54.0276 | | 0.300 | | | |
| 12 (APERTURE) | ∞ | | 29.492 | | | |
| 13 | ∞ | | 55.233 | | | |
| 14 | 41.4739 | * | 14.786 | 5 | 1.83400 | 37.3 |
| 15 | −154.0187 | * | 50.338 | | | |
| 16 | 18.3539 | * | 4.086 | 6 | 1.48749 | 70.4 |
| 17 | 16.8690 | * | 3.159 | | | |
| 18 | 40.1048 | | 4.718 | 7 | 1.49700 | 81.6 |
| 19 | −13.7445 | | 78.172 | | | |
| 20 | −24.7560 | * | −54.193 | MR | | |
| 21 | 84.9301 | * | −4.000 | 8 | 1.53113 | 55.8 |
| 22 | 195.9664 | * | 58.193 | | | |
| IMG | | | −753.869 | | | |

FIG.9

| | i14 | i15 | i16 | i17 | i20 | i21 | i22 |
|---|---|---|---|---|---|---|---|
| R | 41.4739 | -154.0187 | 18.3539 | 16.8690 | -24.7560 | 84.9301 | 195.9664 |
| K | 0.0000 | 0.0000 | -1.1277 | -0.3999 | -1.1202 | -28.2503 | -1.3080 |
| E3 | 0.000000E+00 | 0.000000E+00 | 0.000000E+00 | 0.000000E+00 | 0.000000E+00 | 0.000000E+00 | 0.000000E+00 |
| E4 | -9.393856E-07 | 2.072171E-06 | 5.839763E-05 | 1.511169E-04 | 9.328636E-07 | 3.406331E-06 | 1.489924E-06 |
| E5 | 0.000000E+00 | 0.000000E+00 | 0.000000E+00 | 0.000000E+00 | 0.000000E+00 | 0.000000E+00 | 0.000000E+00 |
| E6 | -3.194720E-10 | 5.084509E-10 | -1.263161E-06 | -1.151091E-06 | -8.584080E-10 | -1.503578E-09 | -3.516724E-10 |
| E7 | 0.000000E+00 | 0.000000E+00 | 0.000000E+00 | 0.000000E+00 | 0.000000E+00 | 0.000000E+00 | 0.000000E+00 |
| E8 | 3.673206E-13 | -1.428614E-13 | -5.701917E-09 | -7.999825E-09 | -3.807911E-12 | 3.237617E-13 | 4.178208E-14 |
| E9 | 0.000000E+00 | 0.000000E+00 | 0.000000E+00 | 0.000000E+00 | 0.000000E+00 | 0.000000E+00 | 0.000000E+00 |
| E10 | 0.000000E+00 | 0.000000E+00 | -7.169796E-11 | -2.615922E-10 | 5.888291E-15 | -2.675039E-17 | -4.456509E-20 |
| E11 | 0.000000E+00 | 0.000000E+00 | 0.000000E+00 | 0.000000E+00 | 0.000000E+00 | 0.000000E+00 | 0.000000E+00 |
| E12 | 0.000000E+00 | 0.000000E+00 | -4.447962E-14 | 3.121923E-12 | -2.401740E-19 | 0.000000E+00 | 0.000000E+00 |
| E13 | 0.000000E+00 | 0.000000E+00 | 0.000000E+00 | 0.000000E+00 | 0.000000E+00 | 0.000000E+00 | 0.000000E+00 |
| E14 | 0.000000E+00 | 0.000000E+00 | 0.000000E+00 | 0.000000E+00 | -4.763677E-21 | 0.000000E+00 | 0.000000E+00 |
| E15 | 0.000000E+00 | 0.000000E+00 | 0.000000E+00 | 0.000000E+00 | 0.000000E+00 | 0.000000E+00 | 0.000000E+00 |
| E16 | 0.000000E+00 | 0.000000E+00 | 0.000000E+00 | 0.000000E+00 | 1.604666E-24 | 0.000000E+00 | 0.000000E+00 |
| E17 | 0.000000E+00 | 0.000000E+00 | 0.000000E+00 | 0.000000E+00 | 0.000000E+00 | 0.000000E+00 | 0.000000E+00 |
| E18 | 0.000000E+00 | 0.000000E+00 | 0.000000E+00 | 0.000000E+00 | 2.081677E-27 | 0.000000E+00 | 0.000000E+00 |
| E19 | 0.000000E+00 | 0.000000E+00 | 0.000000E+00 | 0.000000E+00 | 0.000000E+00 | 0.000000E+00 | 0.000000E+00 |
| E20 | 0.000000E+00 | 0.000000E+00 | 0.000000E+00 | 0.000000E+00 | -1.144070E-30 | 0.000000E+00 | 0.000000E+00 |

FIG.11

| i | R | D | | j | Nd | νd |
|---|---|---|---|---|---|---|
| 0 | ∞ | 0.000 | | | | |
| 1 | ∞ | 11.000 | | | | |
| 2 | ∞ | 35.000 | | PR | 1.51680 | 64.2 |
| 3 | ∞ | 1.000 | | | | |
| 4 | 66.6325 | 5.379 | | 1 | 1.92286 | 20.9 |
| 5 | −113.8956 | 15.967 | | | | |
| 6 | 91.0544 | 3.109 | | 2 | 1.48749 | 70.4 |
| 7 | −161.9748 | 0.300 | | | | |
| 8 | 39.2938 | 5.597 | | 3 | 1.48749 | 70.4 |
| 9 | −29.3646 | 1.200 | | 4 | 1.84666 | 23.8 |
| 10 | 17.9037 | 5.146 | | 5 | 1.56883 | 56.0 |
| 11 | −110.6125 | 0.300 | | | | |
| 12 | 21.2421 | 5.957 | | 6 | 1.48749 | 70.4 |
| 13 | 45.3897 | 3.346 | | | | |
| 14(APERTURE) | ∞ | 1.575 | | | | |
| 15 | −35.2392 | 2.671 | | 7 | 1.48749 | 70.4 |
| 16 | −21.9829 | 5.939 | | | | |
| 17 | −19.2902 | 1.200 | | 8 | 1.60342 | 38.0 |
| 18 | 44.4113 | 1.236 | | | | |
| 19 | 61.4677 | 5.550 | | 9 | 1.84666 | 23.8 |
| 20 | −27.7838 | 16.384 | | | | |
| 21 | −18.1662 | 1.500 | | 10 | 1.51680 | 64.2 |
| 22 | −204.1913 | 12.415 | | | | |
| 23 | 133.4658 | 2.500 | | 11 | 1.84666 | 23.8 |
| 24 | 40.2588 | 20.262 | | 12 | 1.78590 | 43.9 |
| 25 | −60.2808 | 1.538 | | | | |
| 26 | 36.9154 | 19.288 | | 13 | 1.59270 | 35.4 |
| 27 | 157.7956 | 29.015 | | | | |
| 28 | 23.8480 * | 5.902 | | 14 | 1.50966 | 57.0 |
| 29 | 31.7023 * | 1.677 | | | | |
| 30 | 63.0162 | 8.051 | | 15 | 1.60311 | 60.7 |
| 31 | −28.5779 | 6.005 | | | | |
| 32 | −59.6038 | 2.811 | | 16 | 1.80420 | 46.5 |
| 33 | −28.8423 | 9.446 | | | | |
| 34 | 72.9791 | 5.999 | | 17 | 1.51680 | 64.2 |
| 35 | −31.3483 | 57.737 | | | | |
| 36 | −28.5274 * | −49.962 | | MR | | |
| 37 | 35.5607 * | −4.000 | | 18 | 1.53160 | 55.7 |
| 38 | 75.0954 * | 53.962 | | | | |
| IMG | | −745.623 | | | | |

FIG.12

|  | i28 | i29 | i36 | i37 | i38 |
|---|---|---|---|---|---|
| R | 23.8480 | 31.7023 | -28.5274 | 35.5607 | 75.0954 |
| K | -0.8970 | -0.0634 | -0.8458 | -3.0383 | -3.4422 |
| E3 | 0.000000E+00 | 0.000000E+00 | 0.000000E+00 | 0.000000E+00 | 0.000000E+00 |
| E4 | -1.278999E-04 | -9.612118E-05 | -4.891165E-07 | 9.453472E-06 | 4.731178E-06 |
| E5 | 0.000000E+00 | 0.000000E+00 | 0.000000E+00 | 0.000000E+00 | 0.000000E+00 |
| E6 | -7.681570E-08 | 1.565648E-07 | 5.217908E-10 | -1.641397E-09 | -7.427308E-10 |
| E7 | 0.000000E+00 | 0.000000E+00 | 0.000000E+00 | 0.000000E+00 | 0.000000E+00 |
| E8 | 7.811456E-10 | 3.225380E-10 | -9.614244E-13 | 3.853560E-13 | 8.808352E-14 |
| E9 | 0.000000E+00 | 0.000000E+00 | 0.000000E+00 | 0.000000E+00 | 0.000000E+00 |
| E10 | -1.329304E-13 | -1.216732E-12 | 7.458169E-16 | -9.190195E-16 | 1.353487E-16 |
| E11 | 0.000000E+00 | 0.000000E+00 | 0.000000E+00 | 0.000000E+00 | 0.000000E+00 |
| E12 | -2.627787E-15 | 7.196372E-16 | 4.819028E-19 | 0.000000E+00 | 0.000000E+00 |
| E13 | 0.000000E+00 | 0.000000E+00 | 0.000000E+00 | 0.000000E+00 | 0.000000E+00 |
| E14 | 0.000000E+00 | 0.000000E+00 | -6.592292E-22 | 0.000000E+00 | 0.000000E+00 |
| E15 | 0.000000E+00 | 0.000000E+00 | 0.000000E+00 | 0.000000E+00 | 0.000000E+00 |
| E16 | 0.000000E+00 | 0.000000E+00 | -3.226665E-25 | 0.000000E+00 | 0.000000E+00 |
| E17 | 0.000000E+00 | 0.000000E+00 | 0.000000E+00 | 0.000000E+00 | 0.000000E+00 |
| E18 | 0.000000E+00 | 0.000000E+00 | 5.912672E-28 | 0.000000E+00 | 0.000000E+00 |
| E19 | 0.000000E+00 | 0.000000E+00 | 0.000000E+00 | 0.000000E+00 | 0.000000E+00 |
| E20 | 0.000000E+00 | 0.000000E+00 | -1.673946E-31 | 0.000000E+00 | 0.000000E+00 |

FIG.14

| i | R | | D | j | Nd | νd |
|---|---|---|---|---|---|---|
| 0 | ∞ | | 0.000 | | | |
| 1 | ∞ | | 6.100 | | | |
| 2 | ∞ | | 26.700 | PR | 1.51680 | 64.2 |
| 3 | ∞ | | 3.000 | | | |
| 4 | 66.7995 | | 5.820 | 1 | 1.92286 | 20.9 |
| 5 | −91.9760 | | 12.139 | | | |
| 6 | 132.9332 | | 2.919 | 2 | 1.83481 | 42.7 |
| 7 | −191.1759 | | 0.300 | | | |
| 8 | 38.8557 | | 6.297 | 3 | 1.48749 | 70.4 |
| 9 | −29.3169 | | 1.200 | 4 | 1.84666 | 23.8 |
| 10 | 16.7164 | | 6.274 | 5 | 1.51860 | 69.9 |
| 11 | −66.4911 | | 0.300 | | | |
| 12 | 25.3807 | | 3.363 | 6 | 1.48749 | 70.4 |
| 13 | 72.1750 | | 4.350 | | | |
| 14(APERTURE) | ∞ | | 3.103 | | | |
| 15 | −22.5914 | | 3.557 | 7 | 1.48749 | 70.4 |
| 16 | −19.2071 | | 8.748 | | | |
| 17 | −28.6597 | | 1.500 | 8 | 1.65412 | 39.7 |
| 18 | 62.8639 | | 6.000 | 9 | 1.84666 | 23.8 |
| 19 | −32.5119 | | 15.979 | | | |
| 20 | −19.2681 | | 1.500 | 10 | 1.54814 | 45.8 |
| 21 | −81.0075 | | 2.461 | | | |
| 22 | 81.8662 | | 2.500 | 11 | 1.84666 | 23.8 |
| 23 | 37.5718 | | 21.311 | 12 | 1.74400 | 44.9 |
| 24 | −74.1677 | | 7.417 | | | |
| 25 | 42.4818 | | 17.789 | 13 | 1.74400 | 44.9 |
| 26 | 205.3740 | | 31.110 | | | |
| 27 | 23.3149 | * | 6.806 | 14 | 1.50940 | 56.5 |
| 28 | 30.1763 | * | 2.174 | | | |
| 29 | 75.2458 | | 9.984 | 15 | 1.59282 | 68.6 |
| 30 | −30.2637 | | 4.749 | | | |
| 31 | −225.6843 | | 5.103 | 16 | 1.49700 | 81.6 |
| 32 | −29.9747 | | 10.190 | | | |
| 33 | 66.5787 | | 6.000 | 17 | 1.48749 | 70.4 |
| 34 | −35.6998 | | 59.058 | | | |
| 35 | −26.2297 | * | −50.849 | MR | | |
| 36 | 31.6232 | * | −4.042 | 18 | 1.53113 | 55.8 |
| 37 | 65.7150 | * | 54.891 | | | |
| IMG | | | −659.109 | | | |

FIG.15

| | i27 | i28 | i35 | i36 | i37 |
|---|---|---|---|---|---|
| R | 23.3149 | 30.1763 | -26.2297 | 31.6232 | 65.7150 |
| K | 0.4888 | 1.1396 | -0.8874 | -2.7437 | -4.6371 |
| E3 | 0.000000E+00 | 0.000000E+00 | 0.000000E+00 | 0.000000E+00 | 0.000000E+00 |
| E4 | -1.076331E-04 | -7.247045E-05 | -6.049136E-07 | 9.322948E-06 | 4.110119E-06 |
| E5 | 0.000000E+00 | 0.000000E+00 | 0.000000E+00 | 0.000000E+00 | 0.000000E+00 |
| E6 | -1.116311E-07 | 2.969656E-08 | 4.856607E-10 | -1.487008E-09 | -3.966264E-10 |
| E7 | 0.000000E+00 | 0.000000E+00 | 0.000000E+00 | 0.000000E+00 | 0.000000E+00 |
| E8 | 3.896284E-10 | 4.841039E-10 | -7.026444E-13 | -5.203517E-13 | -8.708291E-14 |
| E9 | 0.000000E+00 | 0.000000E+00 | 0.000000E+00 | 0.000000E+00 | 0.000000E+00 |
| E10 | 6.500712E-13 | -1.443372E-12 | 6.003911E-16 | -2.467240E-16 | 1.283695E-16 |
| E11 | 0.000000E+00 | 0.000000E+00 | 0.000000E+00 | 0.000000E+00 | 0.000000E+00 |
| E12 | -3.100197E-15 | 1.011644E-15 | 4.450589E-19 | 0.000000E+00 | 0.000000E+00 |
| E13 | 0.000000E+00 | 0.000000E+00 | 0.000000E+00 | 0.000000E+00 | 0.000000E+00 |
| E14 | 0.000000E+00 | 0.000000E+00 | -5.585385E-22 | 0.000000E+00 | 0.000000E+00 |
| E15 | 0.000000E+00 | 0.000000E+00 | 0.000000E+00 | 0.000000E+00 | 0.000000E+00 |
| E16 | 0.000000E+00 | 0.000000E+00 | -2.914552E-25 | 0.000000E+00 | 0.000000E+00 |
| E17 | 0.000000E+00 | 0.000000E+00 | 0.000000E+00 | 0.000000E+00 | 0.000000E+00 |
| E18 | 0.000000E+00 | 0.000000E+00 | 4.797801E-28 | 0.000000E+00 | 0.000000E+00 |
| E19 | 0.000000E+00 | 0.000000E+00 | 0.000000E+00 | 0.000000E+00 | 0.000000E+00 |
| E20 | 0.000000E+00 | 0.000000E+00 | -1.254248E-31 | 0.000000E+00 | 0.000000E+00 |

FIG.17

| i | R | | D | j | Nd | νd |
|---|---|---|---|---|---|---|
| 0 | ∞ | | 0.000 | | | |
| 1 | ∞ | | 30.000 | | | |
| 2 | ∞ | | 71.000 | PR | 1.51680 | 64.2 |
| 3 | ∞ | | 1.000 | | | |
| 4 | 58.6222 | | 6.124 | 1 | 1.94595 | 18.0 |
| 5 | -268.9280 | | 2.548 | | | |
| 6 | 34.5834 | | 1.800 | 2 | 1.85451 | 25.2 |
| 7 | 22.8148 | | 11.085 | 3 | 1.48749 | 70.4 |
| 8 | -40.0494 | | 1.200 | 4 | 1.84666 | 23.8 |
| 9 | 27.8425 | | 0.585 | | | |
| 10 | 30.0816 | | 5.400 | 5 | 1.65844 | 50.9 |
| 11 | -329.5014 | | 14.873 | | | |
| 12 | 64.8092 | | 6.000 | 6 | 1.48749 | 70.4 |
| 13 | -37.6801 | | 6.524 | | | |
| 14(APERTURE) | ∞ | | 6.403 | | | |
| 15 | -28.8174 | | 1.200 | 7 | 2.00100 | 29.1 |
| 16 | -130.7905 | | 1.216 | | | |
| 17 | -33.2143 | | 1.200 | 8 | 2.00100 | 29.1 |
| 18 | -84.7165 | | 20.544 | | | |
| 19 | -86.0773 | | 4.694 | 9 | 1.84666 | 23.8 |
| 20 | -30.8439 | | 13.055 | | | |
| 21 | -26.4587 | | 1.800 | 10 | 1.56883 | 56.0 |
| 22 | -90.6719 | | 2.448 | | | |
| 23 | 111.6652 | | 2.500 | 11 | 1.84666 | 23.8 |
| 24 | 29.8833 | | 12.932 | 12 | 1.80610 | 33.3 |
| 25 | -198.8111 | | 1.800 | | | |
| 26 | 36.5495 | | 8.795 | 13 | 1.76200 | 40.1 |
| 27 | 93.4650 | | 45.221 | | | |
| 28 | 31.0236 | * | 4.348 | 14 | 1.82115 | 24.1 |
| 29 | 115.6226 | * | 1.529 | | | |
| 30 | 1228.3579 | | 7.654 | 15 | 1.80420 | 46.5 |
| 31 | -24.2781 | | 5.020 | | | |
| 32 | -291.6687 | | 4.417 | 16 | 1.48749 | 70.4 |
| 33 | -24.7771 | | 9.087 | | | |
| 34 | 131.2876 | | 6.000 | 17 | 1.48749 | 70.4 |
| 35 | -23.2422 | | 62.000 | | | |
| 36 | -28.0094 | * | -55.780 | MR | | |
| 37 | 23.4047 | * | -4.067 | 18 | 1.53113 | 55.8 |
| 38 | 33.7671 | * | 59.847 | | | |
| IMG | | | -638.033 | | | |

FIG.18

|     | i28            | i29            | i36            | i37            | i38            |
|-----|----------------|----------------|----------------|----------------|----------------|
| R   | 31.0236        | 115.6226       | −26.2297       | 31.6232        | 65.7150        |
| K   | 3.5652         | 53.9500        | −0.8874        | −2.7437        | −4.6371        |
| E3  | 0.000000E+00   | 0.000000E+00   | 0.000000E+00   | 0.000000E+00   | 0.000000E+00   |
| E4  | −2.040377E−04  | −1.011496E−04  | −6.049136E−07  | 9.322948E−06   | 4.110119E−06   |
| E5  | 0.000000E+00   | 0.000000E+00   | 0.000000E+00   | 0.000000E+00   | 0.000000E+00   |
| E6  | 9.153173E−08   | 2.660239E−07   | 4.856607E−10   | −1.487008E−09  | −3.966264E−10  |
| E7  | 0.000000E+00   | 0.000000E+00   | 0.000000E+00   | 0.000000E+00   | 0.000000E+00   |
| E8  | 1.411045E−09   | 2.165688E−10   | −7.026444E−13  | −5.203517E−13  | −8.708291E−14  |
| E9  | 0.000000E+00   | 0.000000E+00   | 0.000000E+00   | 0.000000E+00   | 0.000000E+00   |
| E10 | −4.635032E−12  | −1.770886E−12  | 6.003911E−16   | −2.467240E−16  | 1.283695E−16   |
| E11 | 0.000000E+00   | 0.000000E+00   | 0.000000E+00   | 0.000000E+00   | 0.000000E+00   |
| E12 | −6.566262E−15  | 8.206198E−16   | 4.450589E−19   | 0.000000E+00   | 0.000000E+00   |
| E13 | 0.000000E+00   | 0.000000E+00   | 0.000000E+00   | 0.000000E+00   | 0.000000E+00   |
| E14 | 0.000000E+00   | 0.000000E+00   | −5.585385E−22  | 0.000000E+00   | 0.000000E+00   |
| E15 | 0.000000E+00   | 0.000000E+00   | 0.000000E+00   | 0.000000E+00   | 0.000000E+00   |
| E16 | 0.000000E+00   | 0.000000E+00   | −2.914552E−25  | 0.000000E+00   | 0.000000E+00   |
| E17 | 0.000000E+00   | 0.000000E+00   | 0.000000E+00   | 0.000000E+00   | 0.000000E+00   |
| E18 | 0.000000E+00   | 0.000000E+00   | 4.797801E−28   | 0.000000E+00   | 0.000000E+00   |
| E19 | 0.000000E+00   | 0.000000E+00   | 0.000000E+00   | 0.000000E+00   | 0.000000E+00   |
| E20 | 0.000000E+00   | 0.000000E+00   | −1.254248E−31  | 0.000000E+00   | 0.000000E+00   |

FIG.20

| i | R | | D | | j | Nd | | νd |
|---|---|---|---|---|---|---|---|---|
| 0 | ∞ | | 0.000 | | | | | |
| 1 | ∞ | | 11.000 | | | | | |
| 2 | ∞ | | 30.000 | | PR | 1.51680 | | 64.2 |
| 3 | ∞ | | 1.746 | | | | | |
| 4 | 32.2902 | | 5.206 | | 1 | 1.94595 | | 18.0 |
| 5 | 196.5448 | | 12.248 | | | | | |
| 6 | 22.7757 | | 4.675 | | 2 | 1.48749 | | 70.4 |
| 7 | −71.0656 | | 0.623 | | | | | |
| 8 | −46.0563 | | 1.200 | | 3 | 1.85451 | | 25.2 |
| 9 | 11.9160 | | 5.388 | | 4 | 1.65844 | | 50.9 |
| 10 | −452.0817 | | 0.300 | | | | | |
| 11 | 14.7925 | * | 3.946 | | 5 | 1.48749 | | 70.2 |
| 12 | 17.4078 | * | 6.035 | | | | | |
| 13 (APERTURE) | ∞ | | 0.300 | | | | | |
| 14 | 16.5886 | | 4.314 | | 6 | 1.71700 | | 48.0 |
| 15 | −26.4651 | | 0.356 | | | | | |
| 16 | −24.3808 | | 1.200 | | 7 | 1.85451 | | 25.2 |
| 17 | 18.6097 | | 2.268 | | | | | |
| 18 | 39.8915 | | 2.623 | | 8 | 1.83481 | | 42.7 |
| 19 | −116.8383 | | 4.875 | | | | | |
| 20 | −11.6973 | | 1.500 | | 9 | 1.58913 | | 61.3 |
| 21 | −23.7850 | | 4.230 | | | | | |
| 22 | −27.8420 | | 2.500 | | 10 | 1.92286 | | 20.9 |
| 23 | −44.1193 | | 1.758 | | | | | |
| 24 | −27.6139 | | 5.352 | | 11 | 2.00100 | | 29.1 |
| 25 | −20.9749 | | 1.529 | | | | | |
| 26 | −4170.2825 | | 4.317 | | 12 | 2.00100 | | 29.1 |
| 27 | −62.0182 | | 0.300 | | | | | |
| 28 | 24.5658 | | 6.088 | | 13 | 2.00100 | | 29.1 |
| 29 | 36.7236 | | 27.113 | | | | | |
| 30 | 25.8733 | * | 4.860 | | 14 | 1.92286 | | 20.9 |
| 31 | 43.4265 | * | 2.501 | | | | | |
| 32 | 95.3324 | | 6.468 | | 15 | 1.83481 | | 42.7 |
| 33 | −18.6403 | | 1.360 | | | | | |
| 34 | −30.0003 | | 2.956 | | 16 | 1.48749 | | 70.4 |
| 35 | −18.0162 | | 8.297 | | | | | |
| 36 | 788.9850 | | 2.314 | | 17 | 1.48749 | | 70.4 |
| 37 | −21.4930 | | 56.000 | | | | | |
| 38 | −23.8739 | * | −43.513 | | MR | | | |
| 39 | 34.9456 | * | −5.258 | | 18 | 1.53113 | | 55.8 |
| 40 | 78.9887 | * | 48.771 | | | | | |
| IMG | | | −678.593 | | | | | |

FIG.21

|     | i11          | i12          | i30          | i31          | i38           | i39          | i40           |
|-----|--------------|--------------|--------------|--------------|---------------|--------------|---------------|
| R   | 14.7925      | 17.4078      | 25.8733      | 43.4265      | -23.8739      | 34.9456      | 78.9887       |
| K   | 0.0000       | 0.0000       | -3.0670      | 10.8692      | -1.0814       | -3.5714      | -0.5961       |
| E3  | 0.000000E+00 | 0.000000E+00 | 0.000000E+00 | 0.000000E+00 | 0.000000E+00  | 0.000000E+00 | 0.000000E+00  |
| E4  | -1.249494E-05| -2.767310E-06| -1.404786E-04| -4.542936E-05| -2.630180E-06 | 8.155750E-06 | 3.284190E-06  |
| E5  | 0.000000E+00 | 0.000000E+00 | 0.000000E+00 | 0.000000E+00 | 0.000000E+00  | 0.000000E+00 | 0.000000E+00  |
| E6  | -1.099630E-07| -3.177747E-07| -1.850236E-07| 2.303576E-07 | -1.002265E-10 | -6.163083E-09| -1.707507E-09 |
| E7  | 0.000000E+00 | 0.000000E+00 | 0.000000E+00 | 0.000000E+00 | 0.000000E+00  | 0.000000E+00 | 0.000000E+00  |
| E8  | 1.381095E-10 | -4.649044E-11| -6.552609E-10| -6.422393E-10| -9.566506E-13 | 1.254256E-12 | 9.098808E-13  |
| E9  | 0.000000E+00 | 0.000000E+00 | 0.000000E+00 | 0.000000E+00 | 0.000000E+00  | 0.000000E+00 | 0.000000E+00  |
| E10 | 0.000000E+00 | 0.000000E+00 | 6.208231E-12 | -6.529511E-12| 6.685962E-16  | -4.783323E-17| -2.756343E-16 |
| E11 | 0.000000E+00 | 0.000000E+00 | 0.000000E+00 | 0.000000E+00 | 0.000000E+00  | 0.000000E+00 | 0.000000E+00  |
| E12 | 0.000000E+00 | 0.000000E+00 | 2.511968E-14 | 1.619075E-14 | 1.188269E-18  | 0.000000E+00 | 0.000000E+00  |
| E13 | 0.000000E+00 | 0.000000E+00 | 0.000000E+00 | 0.000000E+00 | 0.000000E+00  | 0.000000E+00 | 0.000000E+00  |
| E14 | 0.000000E+00 | 0.000000E+00 | 0.000000E+00 | 0.000000E+00 | -2.952963E-22 | 0.000000E+00 | 0.000000E+00  |
| E15 | 0.000000E+00 | 0.000000E+00 | 0.000000E+00 | 0.000000E+00 | 0.000000E+00  | 0.000000E+00 | 0.000000E+00  |
| E16 | 0.000000E+00 | 0.000000E+00 | 0.000000E+00 | 0.000000E+00 | -6.118892E-25 | 0.000000E+00 | 0.000000E+00  |
| E17 | 0.000000E+00 | 0.000000E+00 | 0.000000E+00 | 0.000000E+00 | 0.000000E+00  | 0.000000E+00 | 0.000000E+00  |
| E18 | 0.000000E+00 | 0.000000E+00 | 0.000000E+00 | 0.000000E+00 | 5.164258E-29  | 0.000000E+00 | 0.000000E+00  |
| E19 | 0.000000E+00 | 0.000000E+00 | 0.000000E+00 | 0.000000E+00 | 0.000000E+00  | 0.000000E+00 | 0.000000E+00  |
| E20 | 0.000000E+00 | 0.000000E+00 | 0.000000E+00 | 0.000000E+00 | 1.968308E-31  | 0.000000E+00 | 0.000000E+00  |

FIG.23

| i | R | | D | j | Nd | νd |
|---|---|---|---|---|---|---|
| 0 | ∞ | | 0.000 | | | |
| 1 | ∞ | | 11.000 | | | |
| 2 | ∞ | | 28.000 | PR | 1.51680 | 64.2 |
| 3 | ∞ | | 1.000 | | | |
| 4 | 39.1316 | | 5.150 | 1 | 1.94595 | 18.0 |
| 5 | −4185.8520 | | 17.417 | | | |
| 6 | 27.4467 | | 4.474 | 2 | 1.49700 | 81.6 |
| 7 | −51.9705 | | 0.789 | | | |
| 8 | −32.7677 | | 1.200 | 3 | 1.85451 | 25.2 |
| 9 | 13.7039 | | 5.204 | 4 | 1.65844 | 50.9 |
| 10 | −128.0419 | | 0.300 | | | |
| 11 | 17.6765 | * | 2.269 | 5 | 1.48749 | 70.2 |
| 12 | 19.5406 | * | 5.229 | | | |
| 13 (APERTURE) | ∞ | | 0.300 | | | |
| 14 | 17.9186 | | 4.490 | 6 | 1.71700 | 48.0 |
| 15 | −32.7124 | | 0.304 | | | |
| 16 | −32.4842 | | 1.200 | 7 | 1.85451 | 25.2 |
| 17 | 18.9046 | | 0.863 | | | |
| 18 | 30.9283 | | 3.491 | 8 | 1.83481 | 42.7 |
| 19 | −30.8000 | | 1.699 | | | |
| 20 | −13.3423 | | 1.500 | 9 | 1.58144 | 40.9 |
| 21 | −189.5488 | | 6.762 | | | |
| 22 | −52.1386 | | 2.500 | 10 | 1.85451 | 25.2 |
| 23 | −103.0557 | | 2.685 | | | |
| 24 | −25.8754 | | 4.952 | 11 | 1.83481 | 42.7 |
| 25 | −19.5549 | | 1.538 | | | |
| 26 | 60.6255 | | 4.503 | 12 | 1.92286 | 20.9 |
| 27 | −206.7607 | | 0.300 | | | |
| 28 | 20.0240 | | 4.943 | 13 | 1.90366 | 31.3 |
| 29 | 24.8350 | | 23.780 | | | |
| 30 | 22.1332 | * | 3.879 | 14 | 1.92286 | 20.9 |
| 31 | 49.1753 | * | 2.380 | | | |
| 32 | 114.7630 | | 6.658 | 15 | 1.65844 | 50.9 |
| 33 | −15.5257 | | 1.992 | | | |
| 34 | −21.5893 | | 3.059 | 16 | 1.48749 | 70.4 |
| 35 | −15.3931 | | 11.207 | | | |
| 36 | 90.9373 | | 2.985 | 17 | 1.58913 | 61.3 |
| 37 | −24.9721 | | 55.000 | | | |
| 38 | −20.8465 | * | −43.116 | MR | | |
| 39 | 31.4726 | * | −4.000 | 18 | 1.53113 | 55.8 |
| 40 | 78.1078 | * | 47.116 | | | |
| IMG | | | −689.252 | | | |

FIG.24

| | i11 | i12 | i30 | i31 | i38 | i39 | i40 |
|---|---|---|---|---|---|---|---|
| R | 17.6765 | 19.5406 | 22.1332 | 49.1753 | -20.8465 | 31.4726 | 78.1078 |
| K | 0.0000 | 0.0000 | -4.0195 | 16.8180 | -1.2260 | -2.5090 | -0.8748 |
| E3 | 0.000000E+00 | 0.000000E+00 | 0.000000E+00 | 0.000000E+00 | 0.000000E+00 | 0.000000E+00 | 0.000000E+00 |
| E4 | 1.750673E-05 | 8.225622E-06 | -1.828547E-04 | -7.165804E-05 | -3.524782E-06 | 8.293132E-06 | 3.496898E-06 |
| E5 | 0.000000E+00 | 0.000000E+00 | 0.000000E+00 | 0.000000E+00 | 0.000000E+00 | 0.000000E+00 | 0.000000E+00 |
| E6 | 1.162912E-07 | -2.634349E-08 | 4.546040E-08 | 7.734487E-07 | -2.097571E-09 | -6.064127E-09 | -1.962030E-09 |
| E7 | 0.000000E+00 | 0.000000E+00 | 0.000000E+00 | 0.000000E+00 | 0.000000E+00 | 0.000000E+00 | 0.000000E+00 |
| E8 | 3.829046E-10 | -5.740361E-10 | 6.318092E-09 | -4.243086E-09 | 3.539290E-12 | 1.341293E-12 | 9.842930E-13 |
| E9 | 0.000000E+00 | 0.000000E+00 | 0.000000E+00 | 0.000000E+00 | 0.000000E+00 | 0.000000E+00 | 0.000000E+00 |
| E10 | 0.000000E+00 | 0.000000E+00 | -1.687632E-10 | -6.922375E-12 | -1.366685E-15 | -5.207689E-17 | -2.140017E-16 |
| E11 | 0.000000E+00 | 0.000000E+00 | 0.000000E+00 | 0.000000E+00 | 0.000000E+00 | 0.000000E+00 | 0.000000E+00 |
| E12 | 0.000000E+00 | 0.000000E+00 | 1.106502E-12 | 9.618746E-14 | -2.814005E-18 | 0.000000E+00 | 0.000000E+00 |
| E13 | 0.000000E+00 | 0.000000E+00 | 0.000000E+00 | 0.000000E+00 | 0.000000E+00 | 0.000000E+00 | 0.000000E+00 |
| E14 | 0.000000E+00 | 0.000000E+00 | 0.000000E+00 | 0.000000E+00 | 3.618684E-21 | 0.000000E+00 | 0.000000E+00 |
| E15 | 0.000000E+00 | 0.000000E+00 | 0.000000E+00 | 0.000000E+00 | 0.000000E+00 | 0.000000E+00 | 0.000000E+00 |
| E16 | 0.000000E+00 | 0.000000E+00 | 0.000000E+00 | 0.000000E+00 | 7.891972E-24 | 0.000000E+00 | 0.000000E+00 |
| E17 | 0.000000E+00 | 0.000000E+00 | 0.000000E+00 | 0.000000E+00 | 0.000000E+00 | 0.000000E+00 | 0.000000E+00 |
| E18 | 0.000000E+00 | 0.000000E+00 | 0.000000E+00 | 0.000000E+00 | 2.635167E-27 | 0.000000E+00 | 0.000000E+00 |
| E19 | 0.000000E+00 | 0.000000E+00 | 0.000000E+00 | 0.000000E+00 | 0.000000E+00 | 0.000000E+00 | 0.000000E+00 |
| E20 | 0.000000E+00 | 0.000000E+00 | 0.000000E+00 | 0.000000E+00 | -1.266822E-29 | 0.000000E+00 | 0.000000E+00 |

FIG.26

| i | R | D | | j | Nd | νd |
|---|---|---|---|---|---|---|
| 0 | ∞ | 0.000 | | | | |
| 1 | ∞ | 11.000 | | | | |
| 2 | ∞ | 35.000 | | PR | 1.51680 | 64.2 |
| 3 | ∞ | 3.010 | | | | |
| 4 | −120.5518 | 3.552 | | 1 | 1.94595 | 18.0 |
| 5 | −51.0245 | 0.300 | | | | |
| 6 | 61.2332 | 6.086 | | 2 | 1.49700 | 81.6 |
| 7 | −66.5047 | 0.300 | | | | |
| 8 | 41.3652 | 5.969 | | 3 | 1.49700 | 81.6 |
| 9 | −67.5109 | 1.200 | | 4 | 1.85451 | 25.2 |
| 10 | 23.1891 | 5.998 | | 5 | 1.49700 | 81.6 |
| 11 | 443.5513 | 4.257 | | | | |
| 12 | 20.7710 | 5.262 | | 6 | 1.59270 | 35.4 |
| 13 | 118.9009 | 9.736 | | | | |
| 14(APERTURE) | ∞ | 1.511 | | | | |
| 15 | −54.5272 | 2.369 | | 7 | 1.49700 | 81.6 |
| 16 | −29.1364 | 3.294 | | | | |
| 17 | −18.7538 | 1.876 | | 8 | 1.75520 | 27.5 |
| 18 | 33.2326 | 4.149 | | | | |
| 19 | 95.7370 | 7.962 | | 9 | 1.84666 | 23.8 |
| 20 | −25.8529 | 9.365 | | | | |
| 21 | −19.5383 | 1.500 | | 10 | 1.71700 | 48.0 |
| 22 | −43.6589 | 15.102 | | | | |
| 23 | 1855.5306 | 2.500 | | 11 | 1.84666 | 23.8 |
| 24 | 49.7710 | 49.310 | | 12 | 1.80420 | 46.5 |
| 25 | −63.5992 | 28.556 | | | | |
| 26 | 58.5666 | 21.970 | * | 13 | 1.50966 | 57.0 |
| 27 | 152.4737 | 40.660 | * | | | |
| 28 | 19.3602 | 8.998 | * | 14 | 1.50966 | 57.0 |
| 29 | 21.0413 | 5.602 | * | | | |
| 30 | 71.1044 | 8.090 | | 15 | 1.49700 | 81.6 |
| 31 | −42.8524 | 0.348 | | | | |
| 32 | 39.6353 | 6.155 | | 16 | 1.49700 | 81.6 |
| 33 | −77.8978 | 8.475 | | | | |
| 34 | 42.9081 | 5.413 | | 17 | 1.49700 | 81.6 |
| 35 | −76.0515 | 54.869 | | | | |
| 36 | −28.3035 | 0.000 | * | MR | | |
| IMG | | −745.623 | | | | |

FIG.27

|     | i26            | i27            | i28            | i29            | i36            |
|-----|----------------|----------------|----------------|----------------|----------------|
| R   | 58.5666        | 152.4737       | 19.3602        | 21.0413        | −28.3035       |
| K   | −0.0418        | −53.5554       | −0.2128        | −0.4698        | −0.8874        |
| E3  | 0.000000E+00   | 0.000000E+00   | 0.000000E+00   | 0.000000E+00   | 0.000000E+00   |
| E4  | −4.789160E−07  | −2.977113E−06  | −8.091334E−05  | −9.174285E−05  | 2.309085E−07   |
| E5  | 0.000000E+00   | 0.000000E+00   | 0.000000E+00   | 0.000000E+00   | 0.000000E+00   |
| E6  | 6.495355E−10   | 7.463689E−10   | −1.002076E−07  | 1.091759E−07   | −8.774056E−10  |
| E7  | 0.000000E+00   | 0.000000E+00   | 0.000000E+00   | 0.000000E+00   | 0.000000E+00   |
| E8  | −1.428506E−13  | 8.718588E−13   | 4.958603E−10   | 1.570438E−10   | −1.257237E−13  |
| E9  | 0.000000E+00   | 0.000000E+00   | 0.000000E+00   | 0.000000E+00   | 0.000000E+00   |
| E10 | 2.005629E−16   | 7.753217E−17   | −6.522002E−13  | −7.457344E−13  | 1.994067E−17   |
| E11 | 0.000000E+00   | 0.000000E+00   | 0.000000E+00   | 0.000000E+00   | 0.000000E+00   |
| E12 | −2.844632E−21  | −2.141543E−19  | −6.185209E−17  | 7.555698E−16   | 1.179803E−20   |
| E13 | 0.000000E+00   | 0.000000E+00   | 0.000000E+00   | 0.000000E+00   | 0.000000E+00   |
| E14 | 0.000000E+00   | 0.000000E+00   | 0.000000E+00   | 0.000000E+00   | −6.096073E−24  |
| E15 | 0.000000E+00   | 0.000000E+00   | 0.000000E+00   | 0.000000E+00   | 0.000000E+00   |
| E16 | 0.000000E+00   | 0.000000E+00   | 0.000000E+00   | 0.000000E+00   | −7.149586E−27  |
| E17 | 0.000000E+00   | 0.000000E+00   | 0.000000E+00   | 0.000000E+00   | 0.000000E+00   |
| E18 | 0.000000E+00   | 0.000000E+00   | 0.000000E+00   | 0.000000E+00   | −6.893144E−30  |
| E19 | 0.000000E+00   | 0.000000E+00   | 0.000000E+00   | 0.000000E+00   | 0.000000E+00   |
| E20 | 0.000000E+00   | 0.000000E+00   | 0.000000E+00   | 0.000000E+00   | 1.036932E−33   |

FIG.28A
FIG.28B
FIG.28C
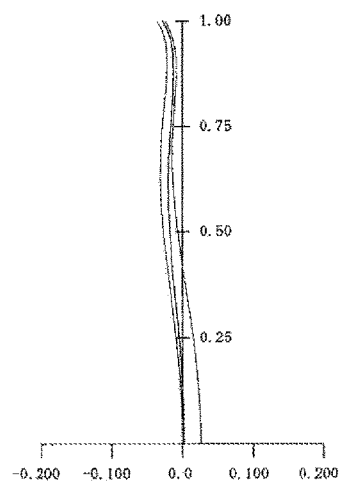
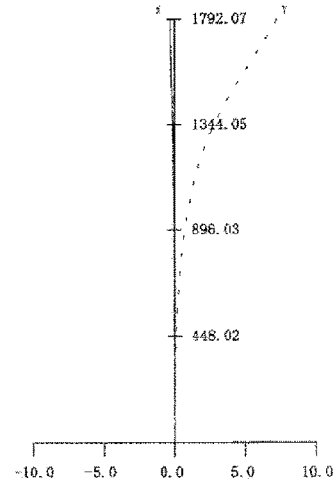
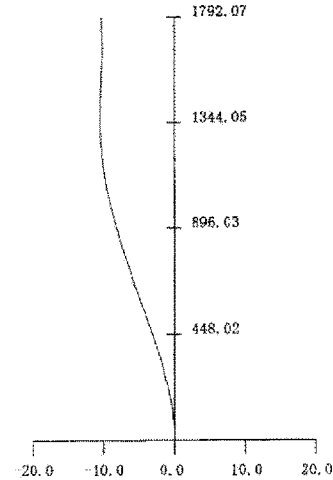
FIG.28D
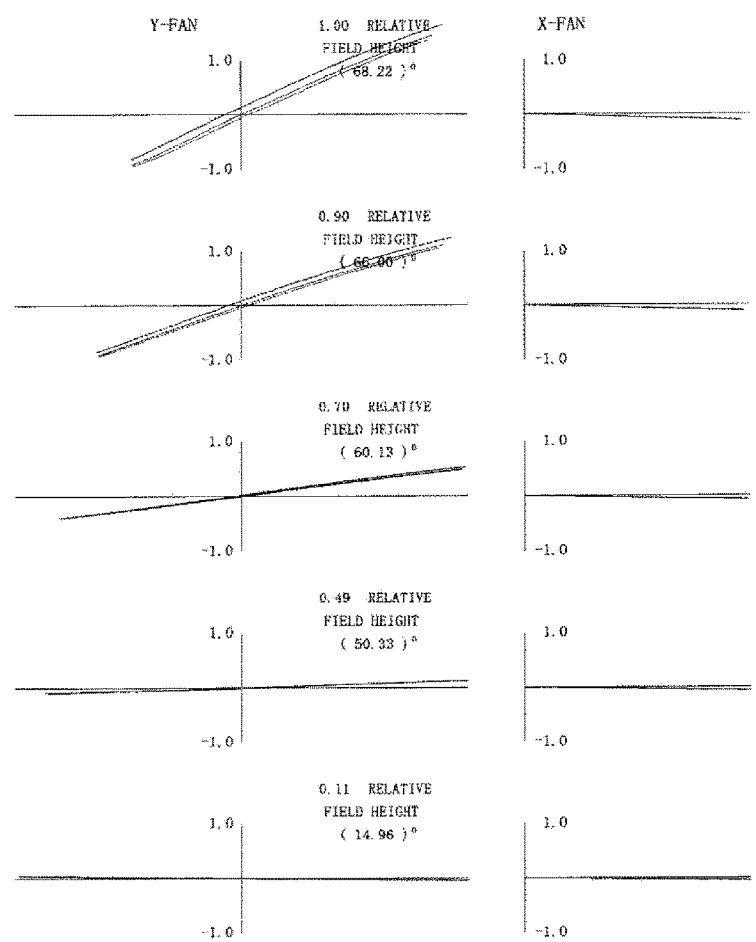

PROJECTION OPTICAL SYSTEM AND IMAGE PROJECTION APPARATUS

CROSS-REFERENCE TO RELATED APPLICATION

The present application is based on and claims priority under 35 U.S.C. § 119 to Japanese Patent Application No. 2020-171907, filed on Oct. 12, 2020, the contents of which are incorporated herein by reference in their entirety.

BACKGROUND OF THE INVENTION

1. Field of the Invention

The present invention relates to a projection optical system and an image projection apparatus.

2. Description of the Related Art

"Image projection apparatuses" are widely known as projector apparatuses and the like, and various types have been proposed.

Various types of projection optical systems have also been proposed for use in image projection apparatuses, for projecting an image displayed on an image display element as an enlarged image on a projection surface. One type of projection optical system is known to include a refractive optical system and a reflective optical system having refractive power. In this type of projection optical system, an imaging light beam emitted from the refractive optical system disposed on the image display element side is reflected by the reflective optical system to form an image on the projection surface (Patent Document 1, and the like).

Furthermore, there is known a projection optical system in which "a second refractive optical system having a weak refractive power" is disposed on the enlargement side of the reflective optical system, in addition to the above-described refractive optical system and reflective optical system (Patent Document 2).

Patent Document 1: Japanese Patent Application No. 2014-80509
Patent Document 2: Japanese Patent No. 4396769

SUMMARY OF THE INVENTION

According to one aspect of the present invention, there is provided a projection optical system configured to enlarge an image that is displayed on an image display surface of an image display element disposed on a reduction side of the projection optical system, and project the image onto a projection surface disposed on an enlargement side of the projection optical system, the projection optical system including a first refractive system, a reflective optical system, and a second refractive system, disposed in a positioning order of the first refractive system followed by the reflective optical system and the reflective optical system followed by the second refractive system in a direction from the reduction side toward the enlargement side, wherein the first refractive system includes a first lens group and a second lens group disposed in a positioning order of the first lens group followed by the second lens group in the direction from the reduction side toward the enlargement side, the first lens group includes a plurality of lenses, by which a first intermediate image is formed with a light beam emitted from the image display element, the second lens group includes at least one lens, by which a second intermediate image is formed with a light beam from the first intermediate image, the reflective optical system includes a mirror that has optical power and that is configured to reflect a light beam from the second intermediate image, and the second refractive system includes a lens that has optical power and that is configured to refract a light beam reflected by the reflective optical system, wherein the projection optical system satisfies a condition (1) as follows: $1.5 < Bf/f < 25$, in which f represents a focal length of an entirety of the projection optical system, and Bf represents a back focus obtained by air conversion.

BRIEF DESCRIPTION OF THE DRAWINGS

FIG. 8 is a diagram illustrating the data of example 1 of an embodiment of the present invention;

FIG. 9 is a diagram illustrating aspheric surface data of example 1 of an embodiment of the present invention;

FIG. 11 is a diagram illustrating data of example 2 of an embodiment of the present invention;

FIG. 12 is a diagram illustrating aspheric surface data of example 2 of an embodiment of the present invention;

FIG. 14 is a diagram illustrating the data of example 3 of an embodiment of the present invention;

FIG. 15 is a diagram illustrating aspheric surface data of example 3 of an embodiment of the present invention;

FIG. 17 is a diagram illustrating the data of example 4 of an embodiment of the present invention;

FIG. 18 is a diagram illustrating aspheric surface data of example 4 of an embodiment of the present invention;

FIG. 20 is a diagram illustrating the data of example 5 of an embodiment of the present invention;

FIG. 21 is a diagram illustrating aspheric surface data of example 5 of an embodiment of the present invention;

FIG. 23 is a diagram illustrating the data of example 6 of an embodiment of the present invention;

FIG. 24 is a diagram illustrating aspheric surface data of example 6 of an embodiment of the present invention;

FIG. 26 is a diagram illustrating the data of a comparative example;

FIG. 27 is a diagram illustrating aspheric surface data of the comparative example;

FIGS. 28A to 28D are aberration diagrams of the comparative example;

DESCRIPTION OF THE EMBODIMENTS

A problem to be addressed by an embodiment of the present invention is to implement a new projection optical system in which a first refractive system is disposed on the reduction side and a second refractive system is disposed on the enlargement side, and a reflective optical system is disposed between the first refractive system and the second refractive system.

Hereinafter, embodiments will be described.

FIGS. 1 to 6 illustrate six examples of the projection optical system according to an embodiment of the present invention. As will be described below, FIGS. 1 to 6 correspond to specific examples 1 to 6, respectively.

To avoid complication, the symbols are common among these figures.

That is, an "image display surface" of the image display element is denoted by a symbol RI, and a "color composition prism" is denoted by a symbol PR. A "first refractive system" is denoted by a symbol RIF1, and a "second refractive system" is denoted by a symbol RIF2.

A "first lens group" is denoted by a symbol LG1, and a "second lens group" is denoted by a symbol LG2. A "mirror" of a reflective optical system is denoted by a symbol M, a "first intermediate image" is denoted by a symbol MI1, a "second intermediate image" is denoted by a symbol MI2, and an "aperture" is denoted by a symbol S.

Figure 1:
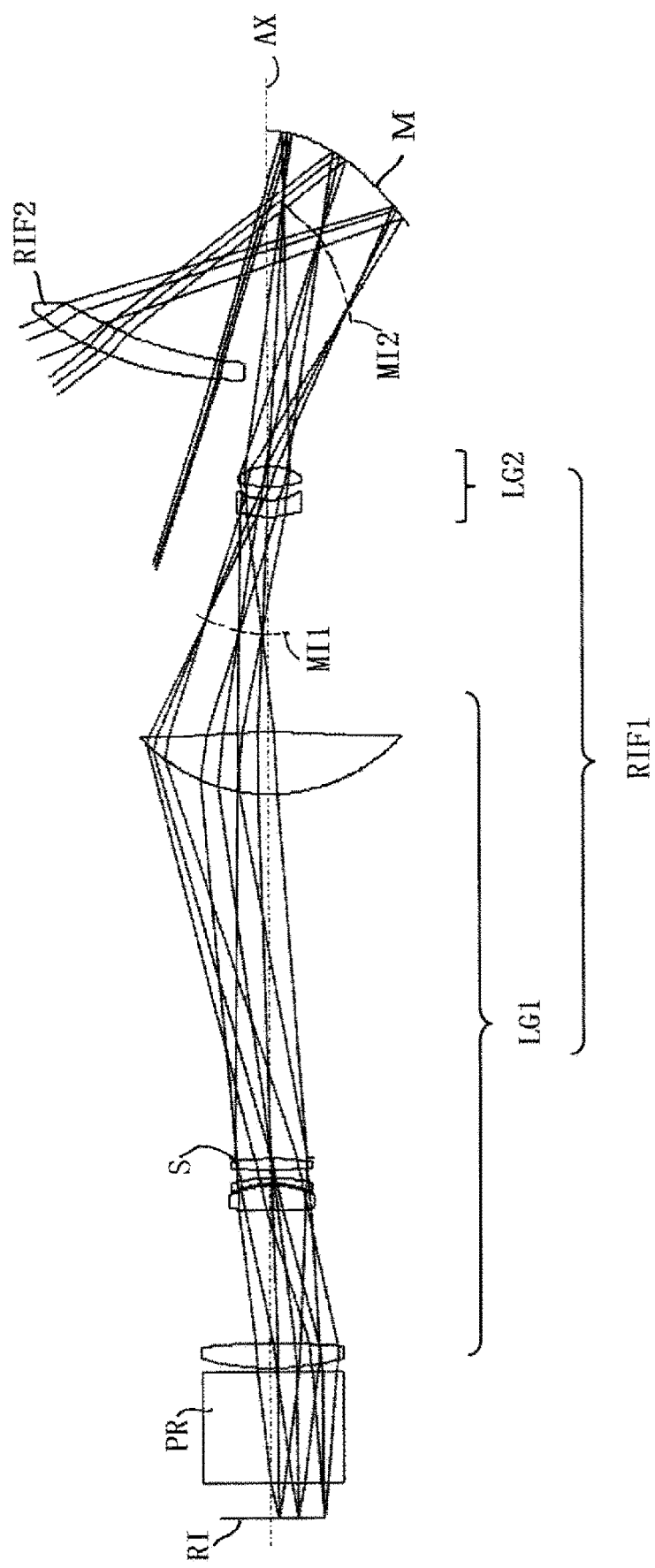
FIG. 1 is a diagram for explaining a lens configuration of a projection optical system according to example 1 of an embodiment of the present invention.

In FIG. 1, the symbol AX denotes an "optical axis".

In FIGS. 1 to 6, the image display element having the image display surface RI is, for example, a liquid crystal panel, a digital mirror device (DMD), or the like, and the image to be projected is displayed on the image display surface RI. The side of the image display surface RI (left in the figure) is the "reduction side".

In the embodiment illustrated in FIGS. 1 to 6, a color image is intended to be displayed. For example, a "green image component" is displayed on the image display surface RI and is illuminated by green light. The image display surface for a red image that displays a red image component and the image display surface for displaying a blue image that displays a blue image component are not illustrated, but are disposed at an "optically equivalent position" to the image display surface RI with respect to the color composition prism PR.

Image light from the image display surface RI on the reduction side is combined with image light from other two image display surfaces (not illustrated) by the color composition prism PR, thereby becoming "color image light".

The color image light is transmitted through the first refractive system RIF1, is reflected by the mirror M of the reflective optical system, thereby entering the second refractive system RIF2, and then is transmitted through the second refractive system RIF2 and projected as an enlarged color image onto a projection surface such as a screen which is not illustrated.

That is, the projection optical system according to an embodiment of the present invention includes the first refractive system RIF1, the reflective optical system, and the second refractive system RIF2 disposed in the stated order from the reduction side toward the enlargement side, and the first refractive system RIF1 includes the first lens group LG1 and the second lens group LG2 disposed in the stated order from the reduction side toward the enlargement side.

The color image light is imaged as the first intermediate image MI1 on the reduction side of the second lens group LG2, by the function of the first lens group LG1, and then enters the second lens group LG2, and is imaged as the second intermediate image MI2 on the reduction side of the mirror M.

The first lens group LG1 includes a plurality of lenses and forms the first intermediate image MI1 with a light beam from the image display surface RI. The second lens group LG2 includes one or more lenses and forms the second intermediate image MI2 with the light beam that formed the first intermediate image MI1.

The reflective optical system includes one mirror M that has optical power and that reflects a light beam from the second intermediate image MI2, and the second refractive system RIF2 includes a lens that has optical power and that refracts the light beam reflected by the reflective optical system.

In the examples illustrated in FIGS. 1 to 6, the mirror M has a "positive power", but a "a mirror having negative power" can be used instead of the mirror M.

The "projection image" to be imaged on the projection surface that is not illustrated in FIGS. 1 to 6, is an image formed by both the mirror M for which the second intermediate image MI2 is the object and the second refractive system RIF2.

The reflective optical system can also include a reflective mirror other than the mirror M.

The second refractive system RIF2 is configured by "one lens" in the examples illustrated in FIGS. 1 to 6, but may be configured by two or more lenses.

In the projection optical system according to an embodiment of the present invention, the focal length of the entire system: f and the air-converted back focus: Bf satisfy the following condition:

$$1.5 < Bf/f < 25 \qquad (1)$$

"Back focus" is the length from the lens that is at the far end on the reduction side in the first lens group LG1 (the lens surface on the reduction side of the lens adjacent to the enlargement side surface of the color composition prism PR) to the image display surface RI. The color composition prism PR is disposed between the above-described lens and the image display surface RI, and, therefore, this is a length that can be obtained by air conversion with respect to the color composition prism PR.

As described above, by forming the first intermediate image MI1 between the first lens group LG1 and the second lens group LG2, the size of the second lens group LG2 can be reduced. Further, by the second lens group LG2, it is possible to easily form the second intermediate image MI2 in which the image plane curvature, the distortion aberration, and the like, in the first lens group LG1 is corrected, thereby reducing the aberration correction amount in the first refractive system RIF1 and reducing the size of the entire first refractive system RIF1.

Furthermore, by disposing the second refractive system RIF2 having an optical power on the enlargement side of the reflective optical system, the residual aberration of the first refractive system RIF1 and the reflective optical system can be corrected by the second refractive system RIF2. Accordingly, it is possible to reduce the extent to which aberration correction may need to be performed in the first refractive system RIF1 and the reflective optical system, thereby reducing the design difficulties thereof.

Further, it is possible to reduce the overall volume of the image projection apparatus, and to reduce the amount of aberration correction in the reflective optical system, thereby contributing to the reduction in the size of the mirror M.

The condition (1) is a condition that achieves both a long back focus and a wide angle.

The parameter Bf/f in the condition (1) increases as the focal length: f of the entire system decreases and as the back focus: Bf increases. As the focal length: f of the entire system becomes smaller, the more likely it is that the angle will be a "wide angle".

The closer to the upper limit of the condition (1), the longer the back focus and the wider the angle in the optical system.

If the upper limit is exceeded, the back focus would become too long, making it difficult to downsize the image projection apparatus in which the projection optical system is used. Further, the focal length: f would decrease and the refractive power of the projection optical system would increase excessively, making correction of the aberration difficult.

If the lower limit is surpassed, it would be difficult to achieve both a long back focus and a wide angle.

In the projection optical system, in addition to the condition (1) described above, it is preferable that at least one of any of the following conditions is satisfied:

$$5 < LTT/Yi < 25.0 \quad (2)$$

$$5.0 < |f1-1|/f \quad (5)$$

$$1.5 < |f1-2|/f < 7.0 \quad (6)$$

The meanings of the symbols in conditions (2), (5), and (6) are as follows.

The notation of "LTT" is the length on the optical axis AX of the lens from the reduction side surface of the lens closest to the image display surface RI, to the reflective surface of the mirror M.

The notation of "Yi" is the maximum length from the optical axis AX of the lens closest to the image display surface RI to the position within the effective image display range of the image display surface RI, via "the center of the effective image display area".

The notation of "f1-1" is the composite focal length of the first lens group LG1.

The notation of "f1-2" is the composite focal length of the second lens group LG2. The second lens group is configured by "one or more lenses" as described above. When the second lens group is configured by one lens, the focal length of this single lens is the "composite focal length" referred to as above.

The notation of "Yi" in condition (2) will be described with reference to FIG. 30.

Figure 30:
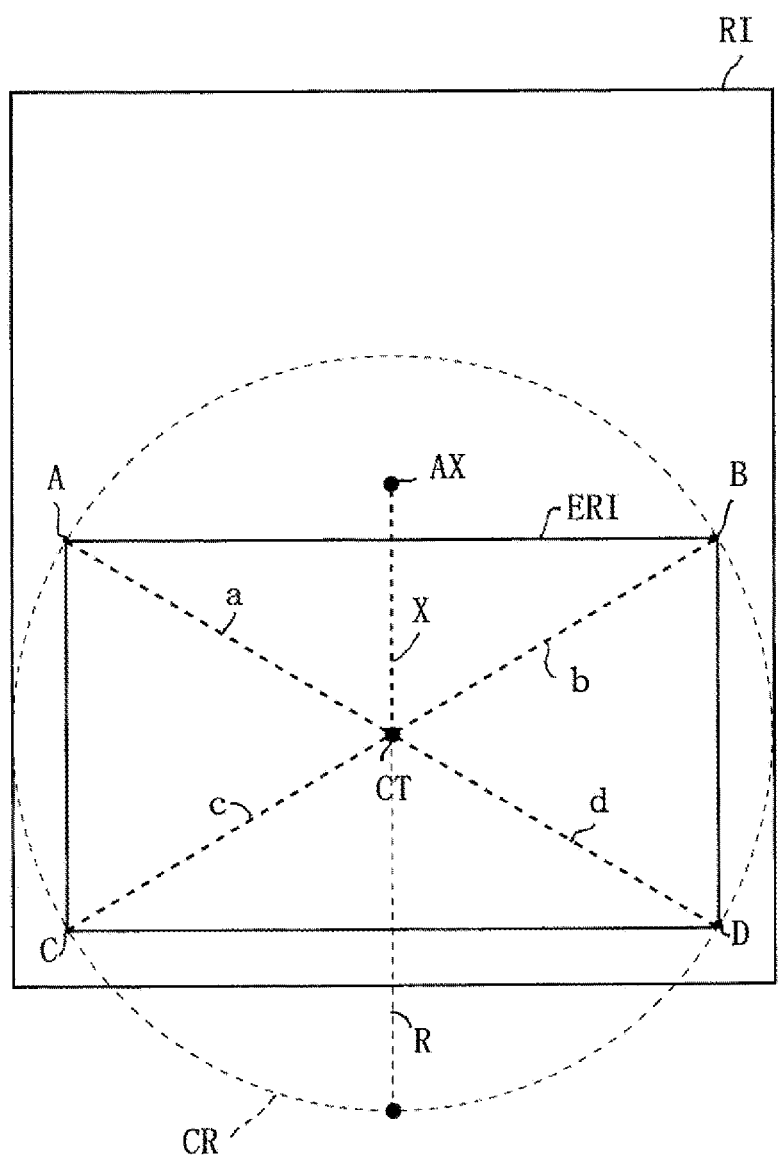
FIG. 30 is a diagram for explaining a Yi according to an embodiment of the present invention.

In FIG. 30, the symbol ERI indicates an "effective image display area" in the image display surface RI. Images projected by the projection optical system are displayed in the effective image display area ERI.

The effective image display area ERI has a rectangular shape, and the four corners thereof are a vertex A, a vertex B, a vertex C, and a vertex D. As illustrated in the figure, the length from the center CT of the effective image display area ERI to each of the vertices A, B, C, and D, is denoted as a, b, c, and d, respectively. Further, the circumscribed circle of the effective image display area ERI passing through the vertices A, B, C, and D is a circumscribed circle CR, and the radius thereof is denoted by R.

The line connecting the optical axis AX of the lens closest to the image display surface RI and the central CT is orthogonal, to the line connecting the vertices A and B. The length between the optical axis AX and the central CT is denoted by X.

In this case, the "maximum length: Yi from the optical axis AX of the lens closest to the image display surface RI to the position within the effective image display area ERI, via the center CT of the effective image display area" is the sum: X+R of the length: X and the radius: R, and this length is also expressed as X+a=X+b=X+c=X+d.

The length: LTT on the optical axis AX of the lens described above, extending from the "reduction side surface" of the lens closest to the image display surface RI to the reflective surface of the mirror M, corresponds to the entire length of the projection optical system illustrated in FIGS. 1 to 6.

When the lower limit of condition (2) is surpassed, the total length of the projection optical system: LTT with respect to the size of the displayed image (corresponding to length: Yi) is shortened, and thus aberration correction tends to be difficult.

If the upper limit of condition (2) is exceeded, it would be advantageous in terms of the aberration correction, but the size of the projection optical system is likely to increase.

If the lower limit of condition (5) is surpassed, the power of the first lens group LG1 becomes too strong relative to the power of the entire projection optical system, and significant distortion aberration in particular is likely to occur, making it difficult to achieve good image quality.

If the lower limit of condition (6) is surpassed, the power of the second lens group LG2 becomes too strong relative to the power of the entire projection optical system, and thus aberration correction tends to be difficult, such as correcting the curvature of the image plane, coma aberration, and the like.

If the upper limit of condition (6) is exceeded, the power of the second lens group LG2 becomes too weak relative to the power of the entire projection optical system, making it easier to correct aberrations such as the curvature of the image plane, coma aberration, and the like, yet while making distortion aberration correction likely to be difficult.

The second refractive system RIF2 may be configured by "two or more lenses" as described above. However, as illustrated in the examples of FIGS. 1 to 6, the second refractive system RIF2 configured by one lens simplifies the structure of the projection optical system and is preferable in terms of downsizing the projection optical system.

In the projection optical system, the optical axis of the first refractive system RIF1 and the optical axis of the second refractive system RIF2 may be configured to be eccentric with each other. However, it is preferable that all lenses included in the first refractive system RIF1, the reflective optical system, and the second refractive system RIF2 are disposed on a common optical axis, in terms of facilitating the manufacturing of the projection optical system. In the examples illustrated in FIGS. 1 to 6, all of the lenses included in the first refractive system RIF1, the reflective optical system, and the second refractive system RIF2 are disposed on a common optical axis (denoted by AX in FIG. 1).

As described above, when all of the lenses included in the first refractive system RIF1, the reflective optical system, and the second refractive system RIF2 are disposed on the common optical axis AX, it is preferable that one of the lenses configuring the second refractive system RIF2 has an aspheric surface having a shape in which positive or negative power monotonically increases from the lens optical axis (i.e., the optical axis AX) toward an off-axis position.

When the second refractive system RIF2 is configured to have an aspheric shape, it is possible to efficiently correct aberrations such as image surface curvature, distortion aberration, and the like, and by making "the positive or negative power monotonically increase" from the lens optical axis toward an off-axis position, it is possible to more efficiently correct distortion aberration and image surface curvature that occur frequently at an off-axis position.

When all of the lenses included in the first refractive system RIF1, the reflective optical system, and the second refractive system RIF2 are disposed on a common optical axis, it is preferable that at least one of the following conditions (3) or (4) is satisfied in addition to the condition (1), or in addition to the condition (1) and the condition (5) and/or (6).

$$0.8 < L1D/MD < 2.0 \quad (3)$$

$$1.5 < MD/Yi < 8.0 \quad (4)$$

"L1D" in condition (3) is the maximum length from the optical axis AX in the effective range of the incident-side lens surface of the second refractive system RIF2, in a direction orthogonal to the optical axis.

"MD" is the maximum length: MD from the optical axis in the effective range of the reflective surface of the mirror M, in the direction orthogonal to the optical axis.

Referring to FIG. 1 as an example, at the exit side surface of the second refractive system RIF2, the "L1D" is the length between the emittance position of the "light beam emitted from the uppermost side" in FIG. 1 and the optical axis AX, in "a direction orthogonal to the optical axis AX".

"MD" is, in FIG. 1, the length between the incident position of "the light beam incident on the lowest side in the figure" of the reflective surface of the mirror M and the optical axis AX, in the "direction orthogonal to the optical axis AX".

"Yi" in condition (4) is the length previously described with reference to FIG. 30.

If the lower limit of condition (3) is surpassed, the effective range of the second refractive system RIF2 becomes excessively small with respect to the effective range of the reflective surface of the mirror M, and aberration correction tends to be difficult, such as correcting the image surface curvature, the distortion aberration, and the like, that had not been corrected in the reflective surface.

If the upper limit of condition (3) is exceeded, the effective range of the second refractive system RIF becomes excessively large with respect to the effective range of the reflective surface of the mirror M, and thus it is advantageous for correction of image surface curvature, distortion aberration, and the like, but maintaining the compactness of the entire projection optical system tends to be difficult.

If the lower limit of the condition (4) is surpassed, the effective range of the reflective surface of the mirror M becomes excessively small with respect to the above-described length: Yi relating to the effective image display area, and thus it is advantageous in terms of compactness. However, the amount of aberration that can be corrected at the reflective surface is reduced, and correcting the image surface curvature or the distortion aberration tends to be difficult.

When the upper limit of the condition (4) is exceeded, the effective range of the reflective surface of the mirror M becomes excessively large with respect to the above-described length: Yi, and this is advantageous in terms of correction of aberrations such as image surface curvature, distortion aberration, and the like, so that a good performance can be obtained. However, the mirror M becomes large, so maintaining the compactness of the entire projection optical system tends to be difficult.

Preferably, in the projection optical system, an aspheric lens is disposed adjacent to the first intermediate image MI1.

By disposing the aspheric lens adjacent to the first intermediate image MI1, it is possible to efficiently correct the coma aberration and obtain good performance.

Preferably, the second lens group LG2 of the projection optical system is configured by one or more aspheric lenses and one or more positive lenses.

It is preferable that the second lens group LG2 has positive power as a whole. However, with only one positive lens, aberrations such as coma aberration, image surface curvature, and the like, cannot be well corrected easily. By combining one or more aspheric lenses and one or more positive lenses, various aberrations can be corrected more efficiently.

By using the projection optical system described above, an image projection apparatus with good performance can be realized.

EXAMPLES

Hereinafter, specific examples of the projection optical system according to an embodiment illustrated in FIGS. 1 to 6 are described. In the following examples, the unit of the quantity of the dimension of length is "mm" unless otherwise indicated.

Example 1

Example 1 is a specific example of the lens configuration according to an embodiment illustrated in FIG. 1.

In example 1, the focal length: f, the F-value: Fno, the field angle: ω (unit: degrees), and the back focus: Bf are as follows.

f=4.6, Fno=2.6, ω=69.6, Bf=26.1

The data relating to example 1 is indicated in FIG. 8.

In FIG. 8, "i" in the top row is the number (plane number) of the plane counted from the reduction side, and the planes include the image display surface RI (i=0), the aperture S (i=12), and the projection surface (i=IMG) such as a screen.

"R" denotes the curvature radius of the plane of plane number i, and "D" denotes the plane spacing between plane numbers i and i+1. Further, "j" is the number of the lens counted from the reduction side, and includes the color composition prism PR and the mirror "MR". "Nd" is the refraction index of the lens, the prism material with respect to the d-line, and "vd" is the Abbe number of the above-described material with respect to the d-line.

The "(asterisk)" in the third column from the left of FIG. 8 indicates that the surface of the plane number in question is an "aspheric surface". The curvature radius: R in the lens surface that is an aspheric surface is a "paraxial curvature radius".

In the following examples, "an aspheric surface" is expressed by a known formula as follows:

$$Z = (h^2/R)/[1+\sqrt{1-(1+K)(h/R)^2}]+\Sigma Ei \cdot h^n \quad (n=3 \text{ to } 20)$$

In this formula, "Z" is the aspheric amount, "R" is the paraxial curvature radius, "h" is the length from the optical axis in the aspheric surface, "K" is the conic constant, "En (n=3 to 20)" is the aspheric coefficient of the third to twentieth order.

"Aspheric Surface Data"

The aspheric surface data of example 1 is indicated in FIG. 9. In FIG. 9, the top row indicates the plane number of the lens surface having an aspheric surface.

The values of the quantities relating to conditions (1) to (6) of the projection optical system of example 1 are as follows.

Bf=26.1
f=4.6
LTT=289.4
Yi=12.5
L1D=109.9
MD=64.3
f1-1=-43
f1-2=23.0

"Values of Parameters in Conditional Expression"

The values of parameters in conditions (1) to (6) are as follows.

(1) 5.6
(2) 23.2
(3) 1.7
(4) 5.1
(5) 9.2
(6) 4.9

Figure 10A:
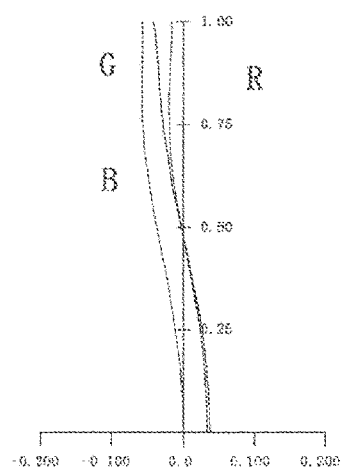
FIGS. 10A to 10D are aberration diagrams of example 1 of an embodiment of the present invention.
Figure 10B:
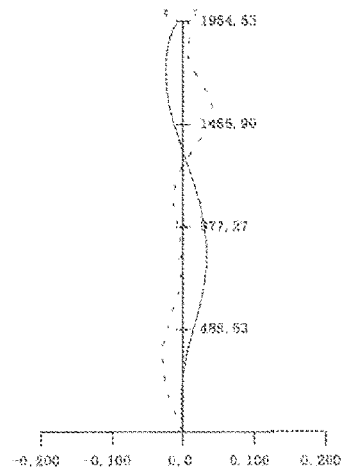
Figure 10C:
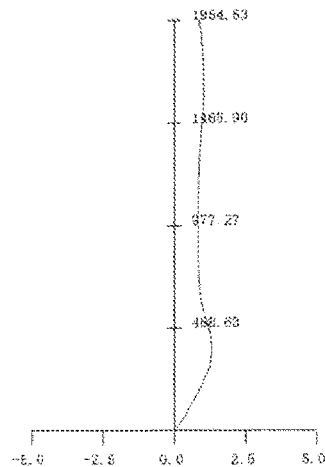
Figure 10D:
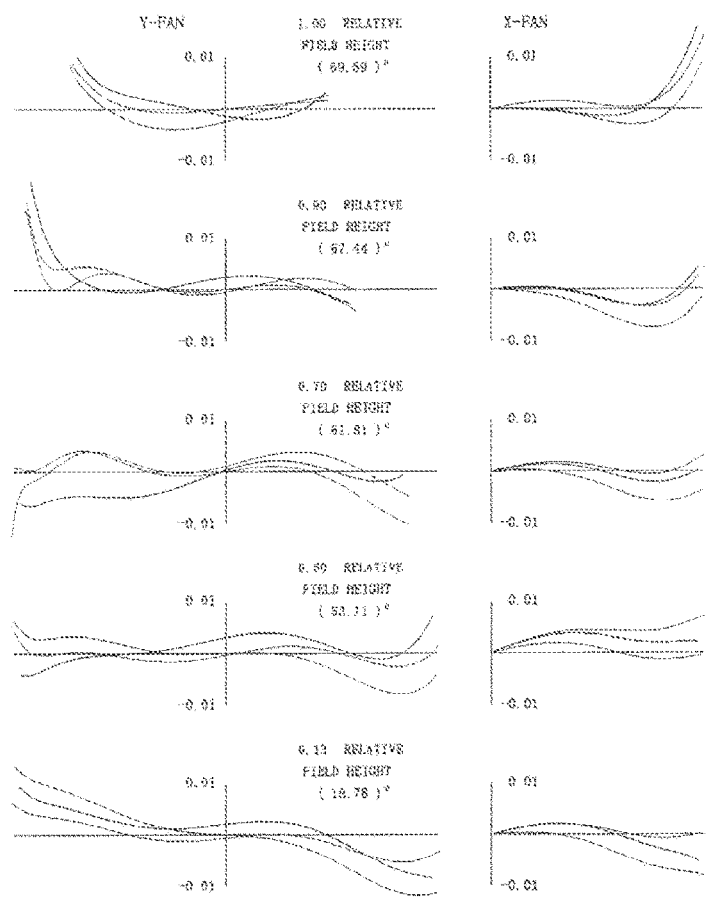
Figure 13A:
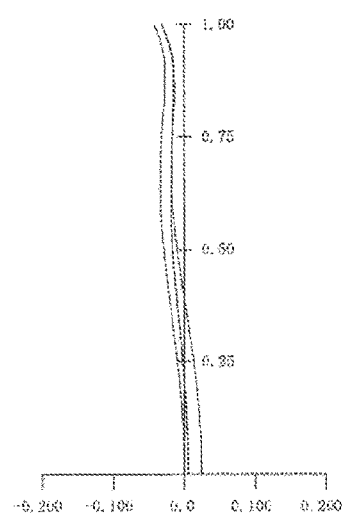
FIGS. 13A to 13D are aberration diagrams of example 2 of an embodiment of the present invention.
Figure 13B:
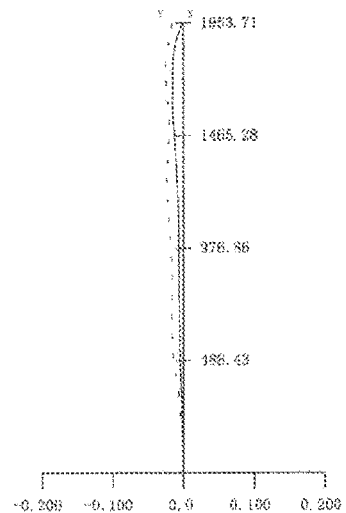
Figure 13C:
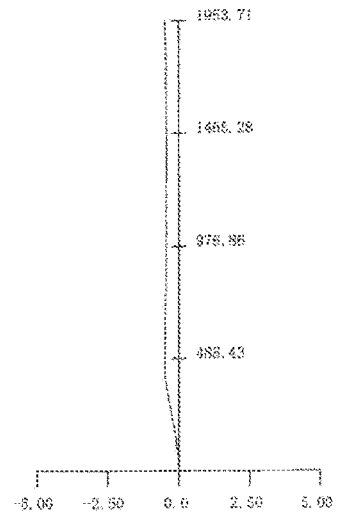
Figure 13D:
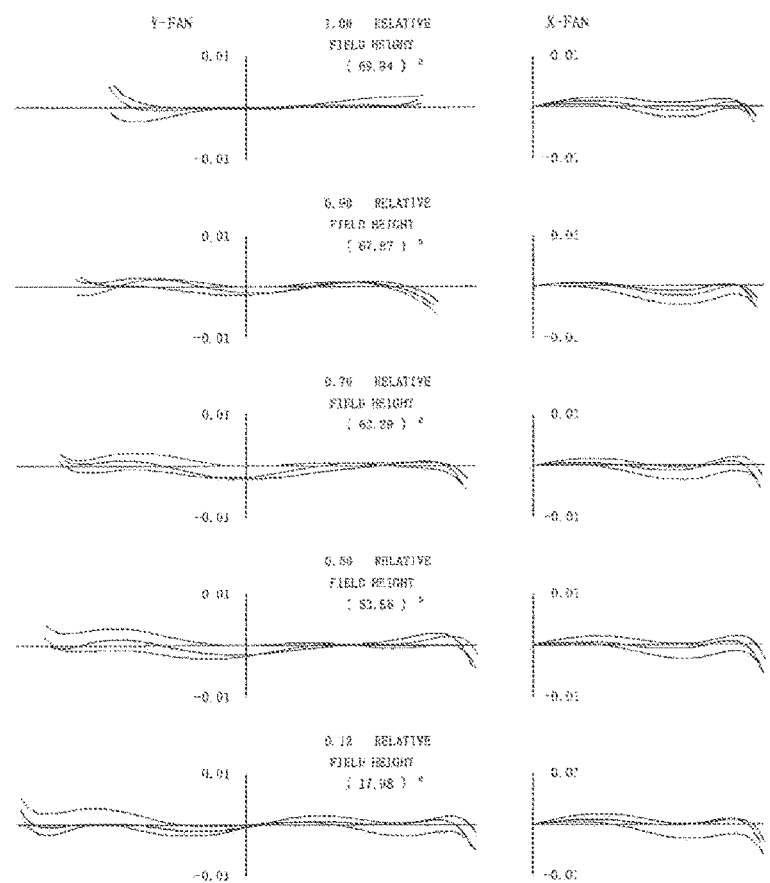
Figure 16A:
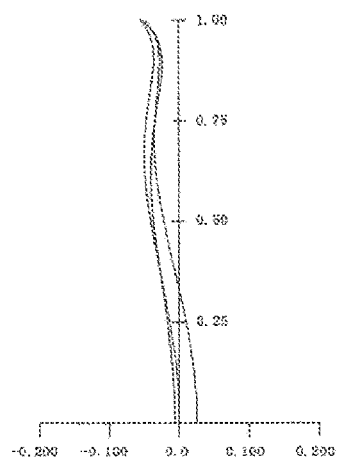
FIGS. 16A to 16D are aberration diagrams of example 3 of an embodiment of the present invention.
Figure 16B:
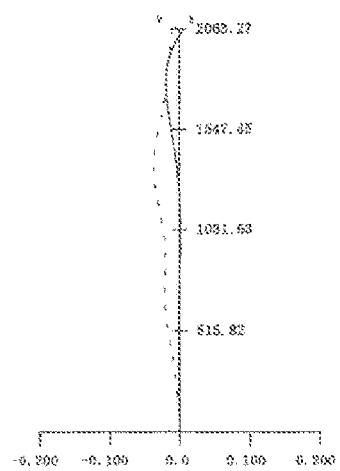
Figure 16C:
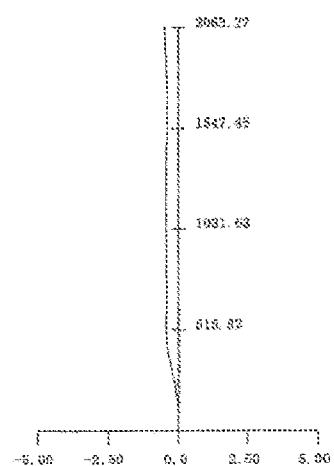
Figure 16D:
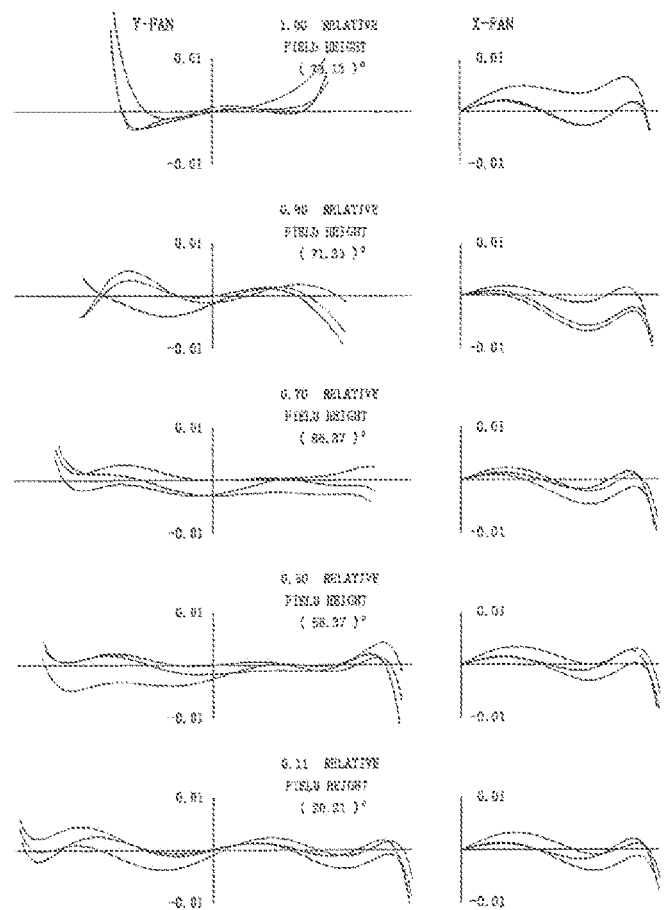
Figure 19A:
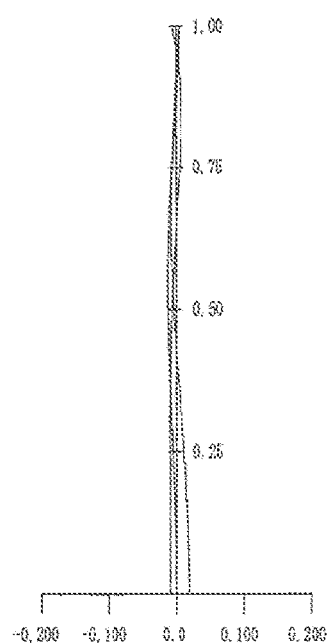
FIGS. 19A to 19D are aberration diagrams of example 4 of an embodiment of the present invention.
Figure 19B:
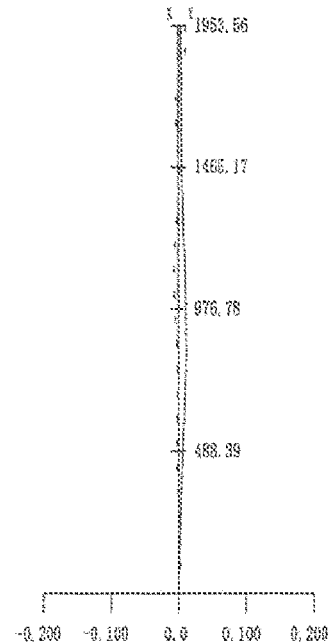
Figure 19C:
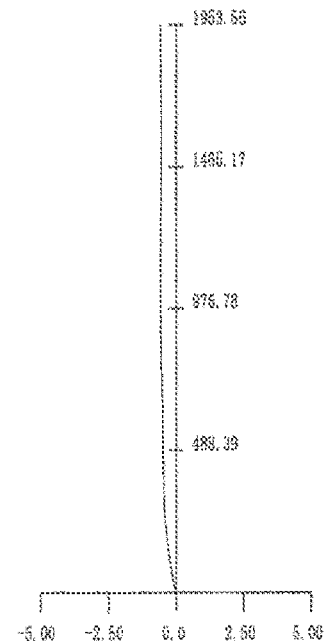
Figure 19D:
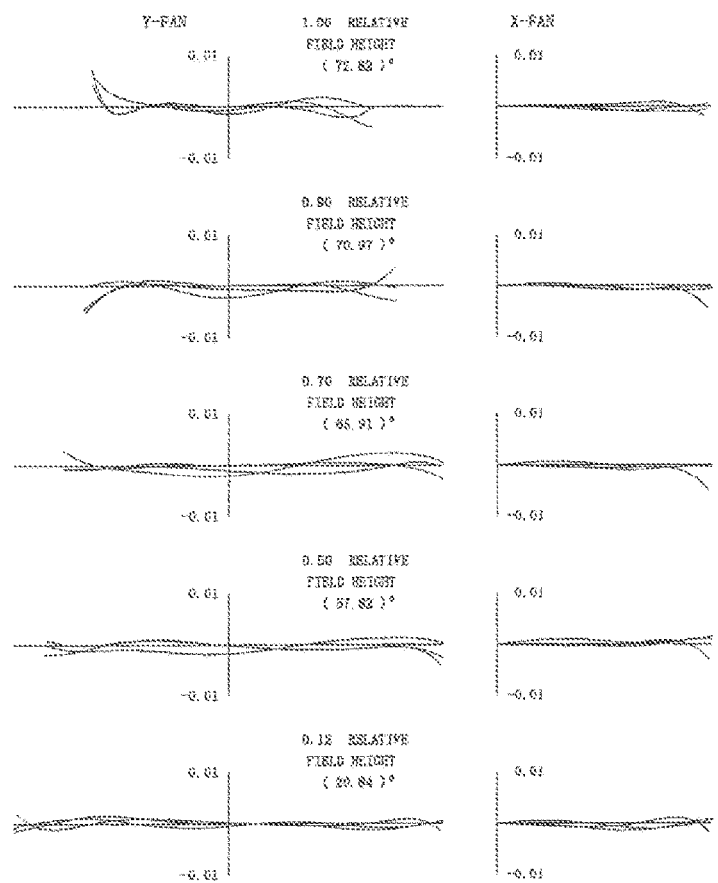
Figure 22A:
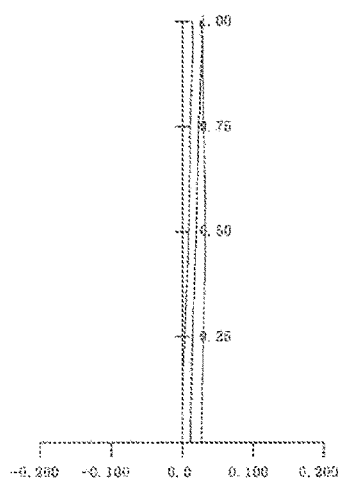
FIGS. 22A to 22D are aberration diagrams of example 5 of an embodiment of the present invention.
Figure 22B:
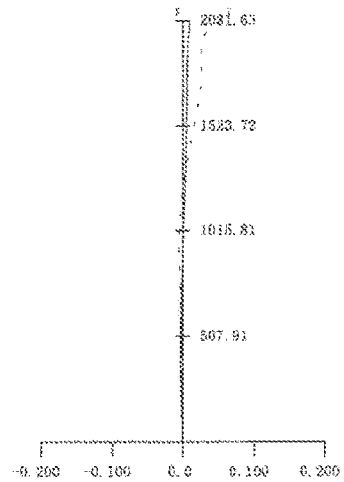
Figure 22C:
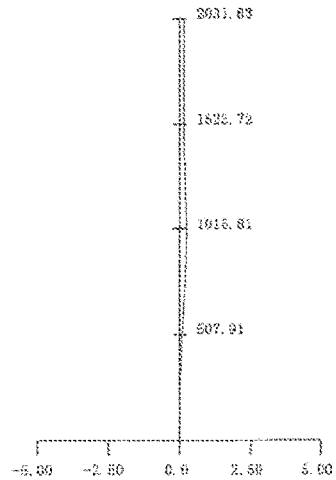
Figure 22D:
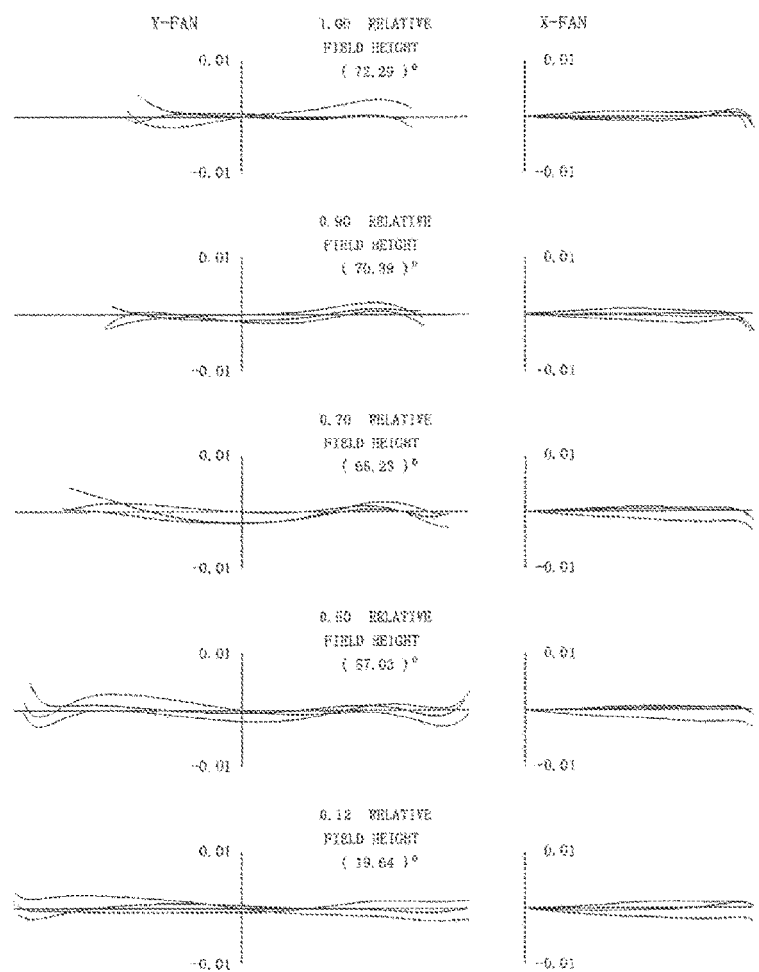
Figure 25A:
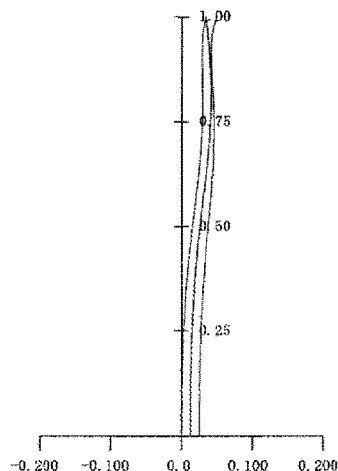
FIGS. 25A to 25D are aberration diagrams of example 6 of an embodiment of the present invention.
Figure 25B:
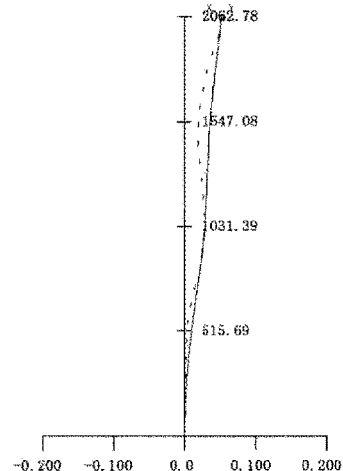
Figure 25C:
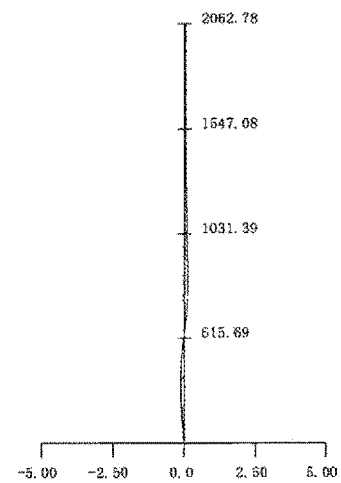
Figure 25D:
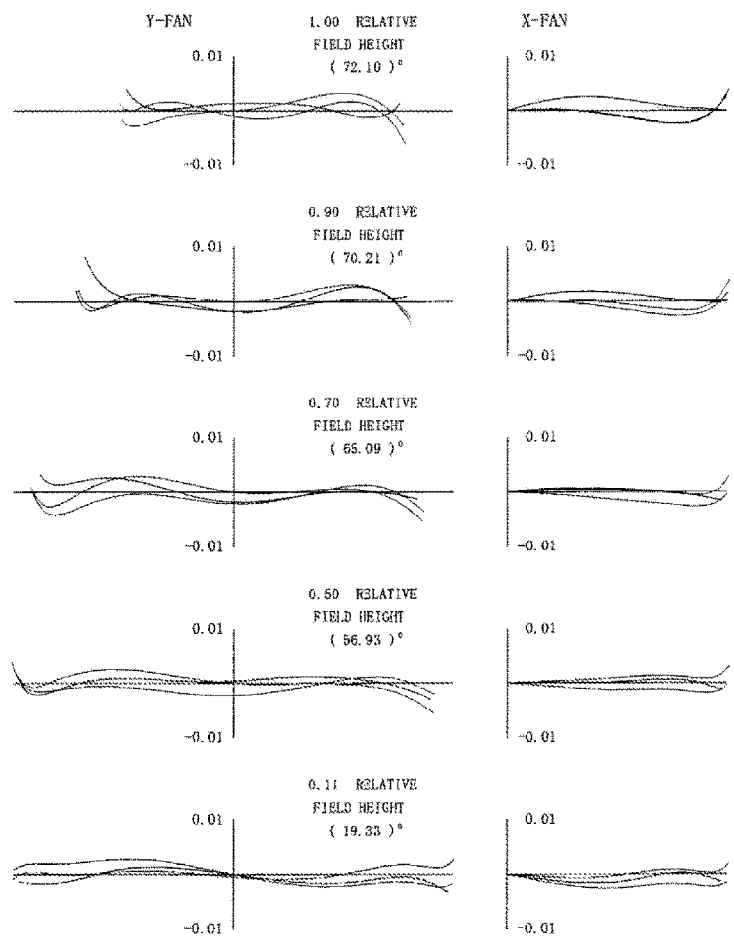

Aberration diagrams relating to the projection optical system according to example 1 are illustrated in FIGS. 10A to 10D. FIG. 10A is a spherical aberration diagram, FIG. 10B is an astigmatic aberration diagram, FIG. 10C is a distorted aberration diagram, and FIG. 10D is a coma aberration diagram. The spherical aberration diagram and coma aberration diagram illustrate light at three wavelengths: R=620 nm, G=550 nm, and B=450 nm. The solid line in the astigmatism diagram represents a "sagittal light beam" and the dashed line represents a "meridional light beam". Each aberration is well corrected, and the projection optical system according to example 1 has good performance.

Example 2

Figure 2:
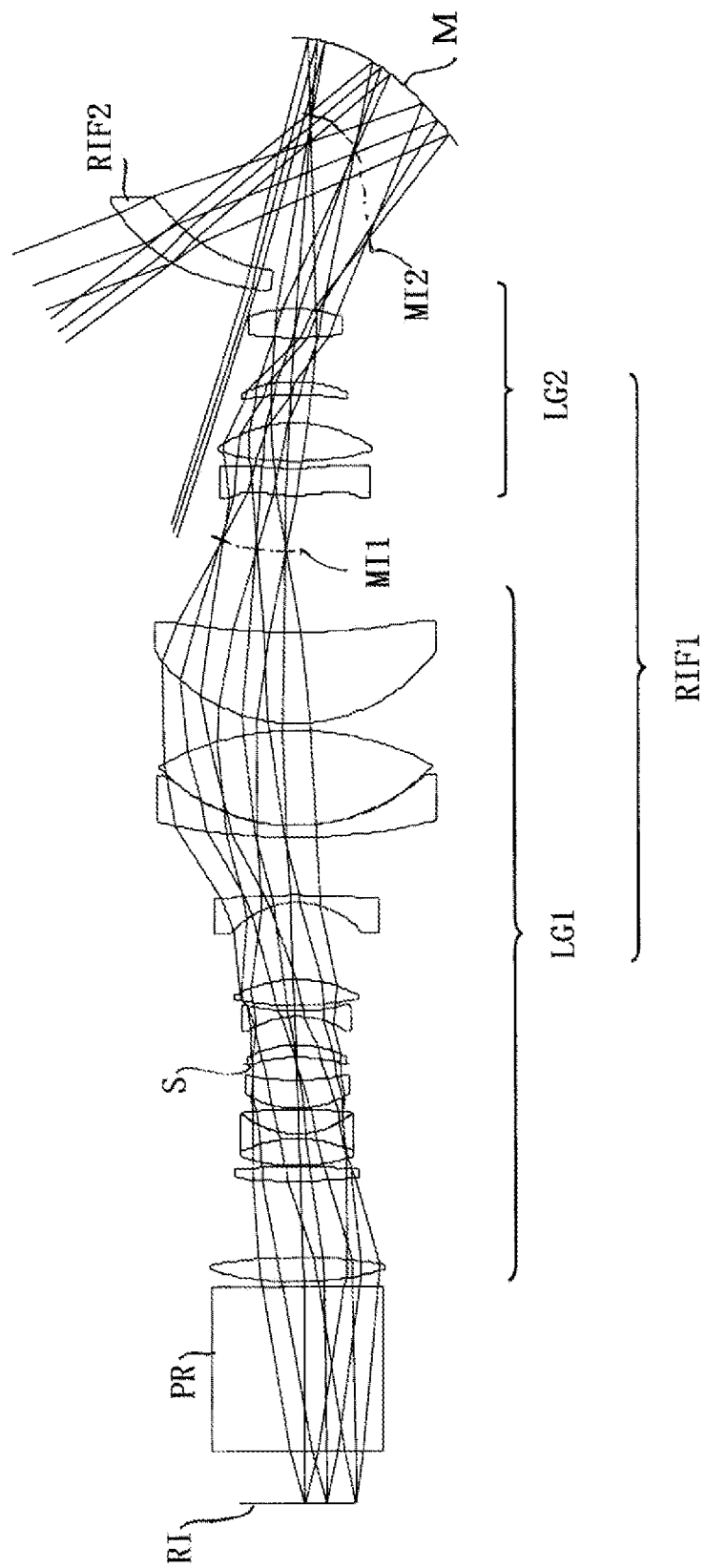
FIG. 2 is a diagram for explaining a lens configuration of a projection optical system according to example 2 of an embodiment of the present invention.

Example 2 is a specific example of the lens configuration according to an embodiment illustrated in FIG. 2.

In example 2, the focal length: f, the F-value: Fno, the field angle: ω (unit: degrees), and the back focus: Bf are as follows.

f=4.6, Fno=2.0, ω=69.9, Bf=35.1

The data relating to example 2 is illustrated in FIG. 11 in the same manner as FIG. 8.

"Aspheric Surface Data"

The aspheric surface data of example 2 is indicated in FIG. 12 in the same manner as FIG. 9.

The values of the quantities relating to conditions (1) to (6) of the projection optical system of example 2 are as follows.

Bf=35.1
f=4.6
LTT=265.0
Yi=12.5
L1D=75.0
MD=66.5
f1-1=-114
f1-2=23.3

"Values of Parameters in Conditional Expression"

The values of parameters in conditions (1) to (6) are as follows.

(1) 7.6
(2) 21.2
(3) 1.1
(4) 5.3
(5) 24.6
(6) 5.0

Aberration diagrams relating to the projection optical system according to example 2 are illustrated in FIGS. 13A to 13D, in the same manner as FIGS. 10A to 10D. Each aberration is well corrected, and the projection optical system according to example 2 has good performance.

Example 3

Figure 3:
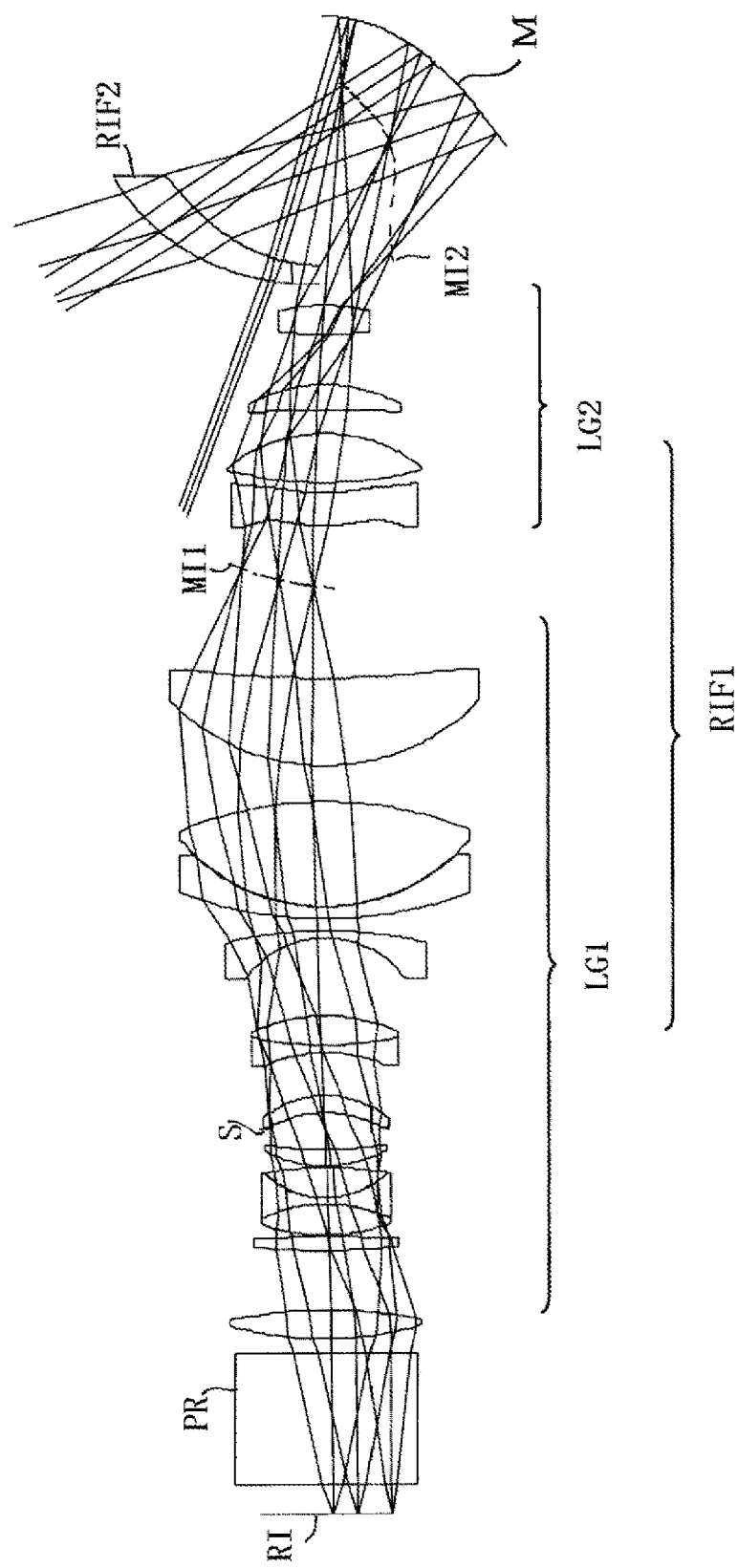
FIG. 3 is a diagram for explaining a lens configuration of a projection optical system according to example 3 of an embodiment of the present invention.

Example 3 is a specific example of the lens configuration according to an embodiment illustrated in FIG. 3.

In example 3, the focal length: f, the F-value: Fno, the field angle: ω (unit: degrees), and the back focus: Bf are as follows.

f=4.1, Fno=1.6, ω=73.2, Bf=26.7

The data relating to example 3 is illustrated in FIG. 14 in the same manner as FIG. 8.

"Aspheric Surface Data"

The aspheric surface data of example 3 is indicated in FIG. 15 in the same manner as FIG. 9.

The values of the quantities relating to conditions (1) to (6) of the projection optical system of example 3 are as follows.

Bf=26.7
f=4.1
LTT=270.0
Yi=13.2
L1D=80.0
MD=69.1
f1-1=-365
f1-2=23.6

"Values of Parameters in Conditional Expression"

The values of parameters in conditions (1) to (6) are as follows.

(1) 6.6
(2) 20.5
(3) 1.2
(4) 5.2
(5) 90.0
(6) 6.3

Aberration diagrams relating to the projection optical system according to example 3 are illustrated in FIGS. 16A to 16D, in the same manner as FIGS. 10A to 10D. Each aberration is well corrected, and the projection optical system according to example 3 has good performance.

Example 4

Figure 4:
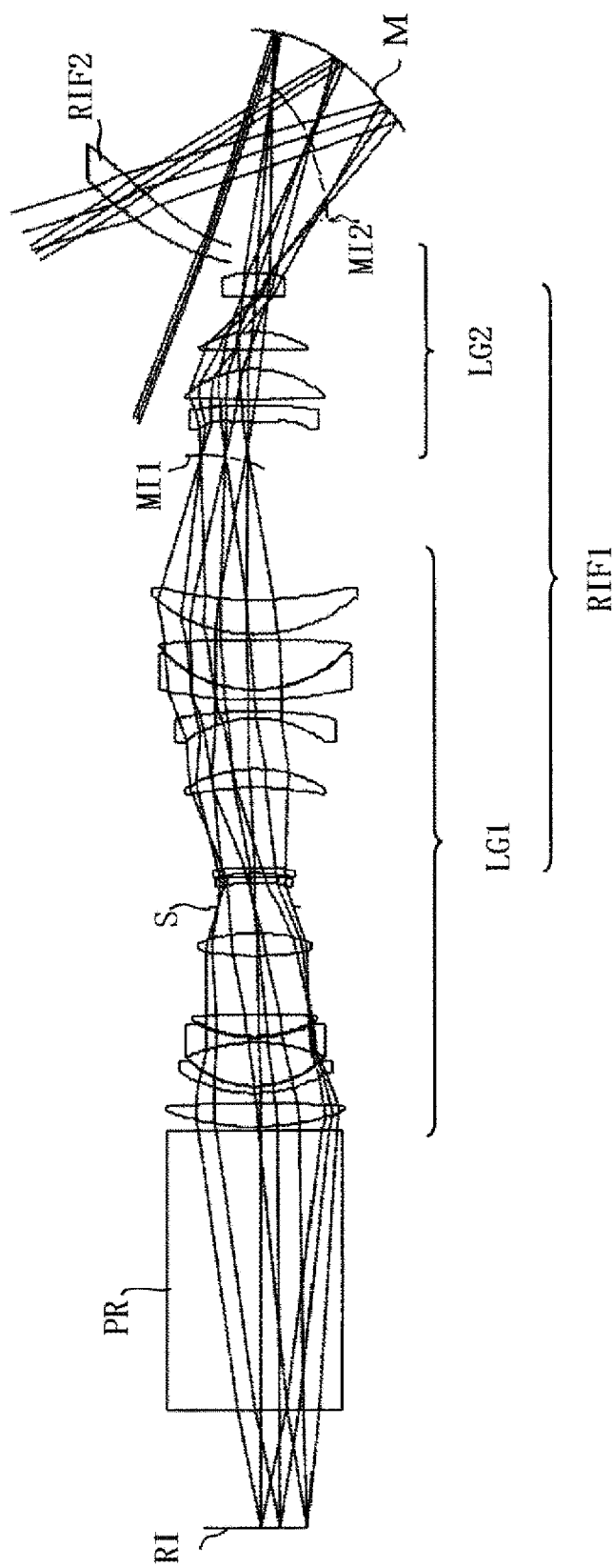
FIG. 4 is a diagram for explaining a lens configuration of a projection optical system according to example 4 of an embodiment of the present invention.

Example 4 is a specific example of the lens configuration according to an embodiment illustrated in FIG. 4.

In example 4, the focal length: f, the F-value: Fno, the field angle: ω (unit: degrees), and the back focus: Bf are as follows.

f=3.9, Fno=2.6, ω=72.8, Bf=77.8

The data relating to example 4 is illustrated in FIG. 17 in the same manner as FIG. 8.

"Aspheric Surface Data"

The aspheric surface data of example 4 is indicated in FIG. 18 in the same manner as FIG. 9.

The values of the quantities relating to conditions (1) to (6) of the projection optical system of example 4 are as follows.
Bf=77.8
f=3.9
LTT=280.0
Yi=12.5
L1D=79.6
MD=70.0
f1-1=−1311.5
f1-2=20.3
"Values of Parameters in Conditional Expression"
The values of parameters in conditions (1) to (6) are as follows.
(1) 19.7
(2) 22.4
(3) 1.1
(4) 5.6
(5) 332.9
(6) 5.2

Aberration diagrams relating to the projection optical system according to example 4 are illustrated in FIGS. 19A to 19D, in the same manner as FIGS. 10A to 10D. Each aberration is well corrected, and the projection optical system according to example 4 has good performance.

Example 5

Figure 5:
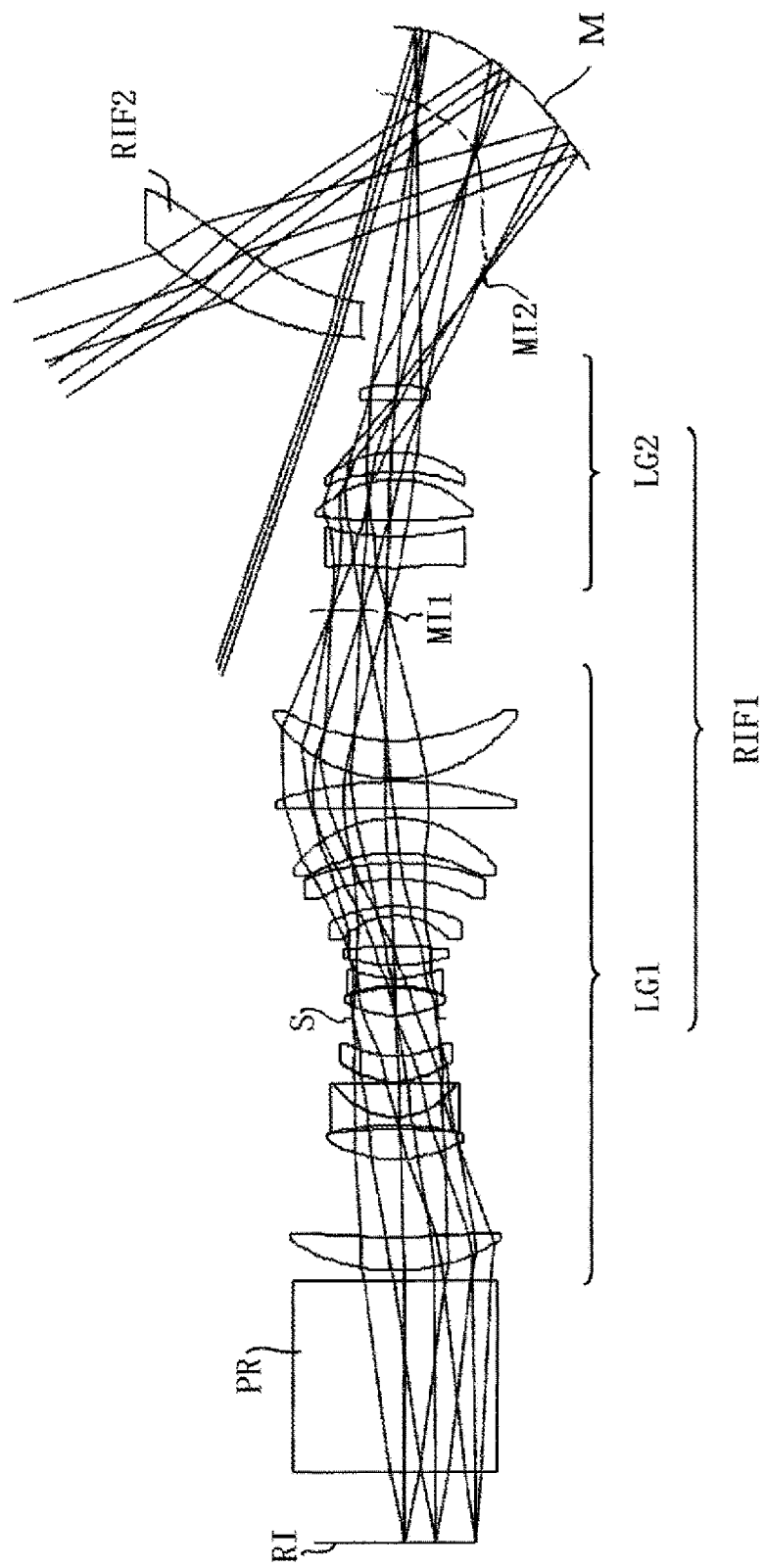
FIG. 5 is a diagram for explaining a lens configuration of a projection optical system according to example 5 of an embodiment of the present invention.

Example 5 is a specific example of the lens configuration according to an embodiment illustrated in FIG. 5.
In example 5, the focal length: f, the F-value: Fno, the field angle: ω (unit: degrees), and the back focus: Bf are as follows.
f=4.2, Fno=2.4, ω=72.3, Bf=32.5
The data relating to example 5 is illustrated in FIG. 20 in the same manner as FIG. 8.
"Aspheric Surface Data"
The aspheric surface data of example 5 is indicated in FIG. 21 in the same manner as FIG. 9.
The values of the quantities relating to conditions (1) to (6) of the projection optical system of example 5 are as follows.
Bf=32.5
f=4.2
LTT=195.0
Yi=13.0
L1D=78.2
MD=59.5
f1-1=−253
f1-2=15.7
"Values of Parameters in Conditional Expression"
The values of parameters in conditions (1) to (6) are as follows.
(1) 7.7
(2) 15.0
(3) 1.3
(4) 4.6
(5) 60.1
(6) 3.7

Aberration diagrams relating to the projection optical system according to example 5 are illustrated in FIGS. 22A to 22D, in the same manner as FIGS. 10A to 10D. Each aberration is well corrected, and the projection optical system according to example 5 has good performance.

Example 6

Figure 6:
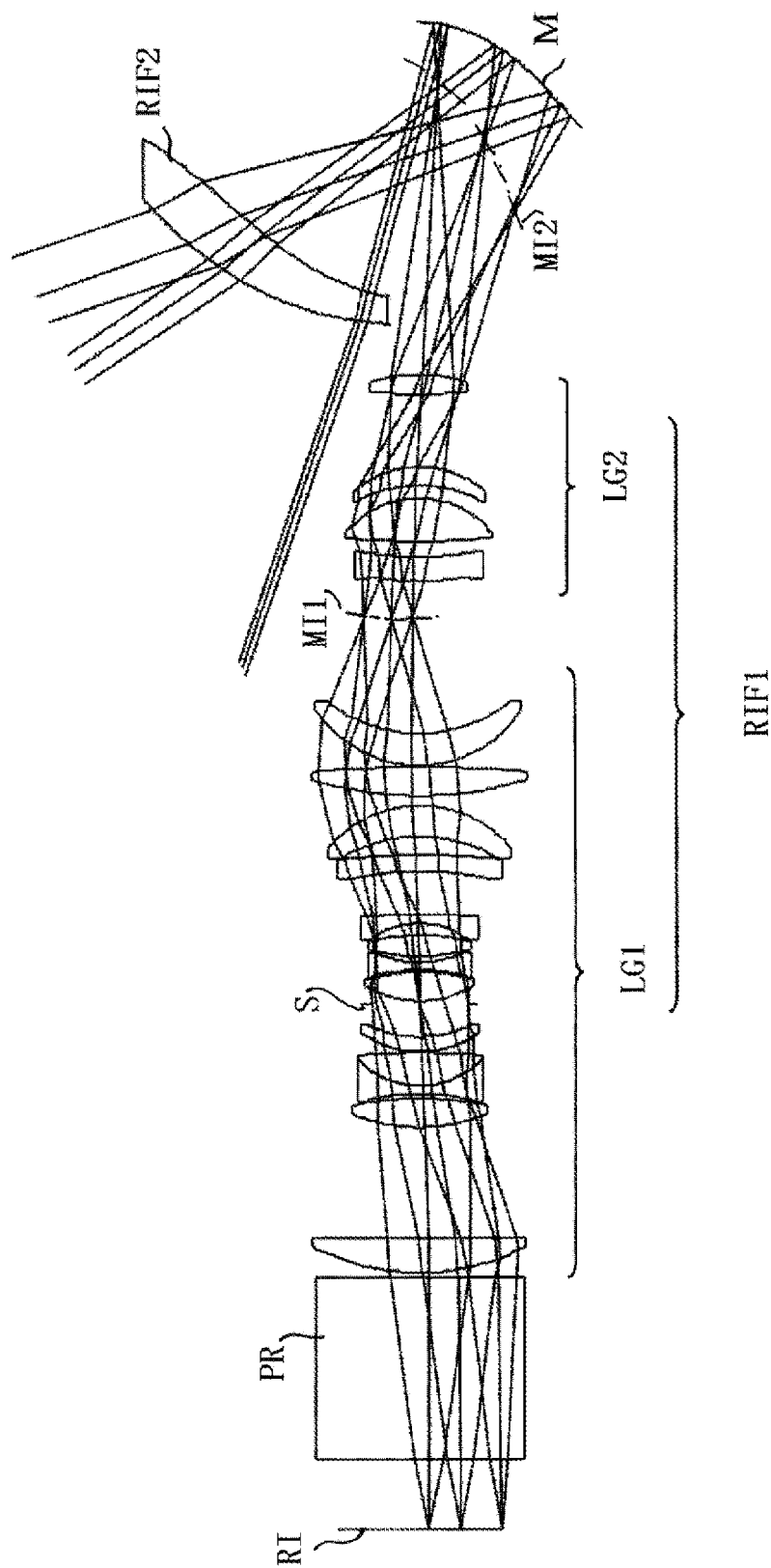
FIG. 6 is a diagram for explaining a lens configuration of a projection optical system according to example 6 of an embodiment of the present invention.

Example 6 is a specific example of the lens configuration according to an embodiment illustrated in FIG. 6.
In example 6, the focal length: f, the F-value: Fno, the field angle: ω (unit: degrees), and the back focus: Bf are as follows.
f=4.3, Fno=2.4, Bf=30.5
The data relating to example 6 is illustrated in FIG. 23 in the same manner as FIG. 8.
"Aspheric Surface Data"
The aspheric surface data of example 6 is indicated in FIG. 24 in the same manner as FIG. 9.
The values of the quantities relating to conditions (1) to (6) of the projection optical system of example 5 are as follows.
Bf=30.5
f=4.3
LTT=195.0
Yi=13.2
L1D=85.0
MD=48.9
f1-1=2060
f1-2=18.2
"Values of Parameters in Conditional Expression"
The values of parameters in conditions (1) to (6) are as follows.
(1) 7.1
(2) 14.8
(3) 1.7
(4) 3.7
(5) 481.4
(6) 4.3

Aberration diagrams relating to the projection optical system according to example 6 are illustrated in FIGS. 25A to 25D, in the same manner as FIGS. 10A to 10D. Each aberration is well corrected, and the projection optical system according to example 6 has good performance.

Comparative Example

As described above, one of the features of the projection optical system according to an embodiment of the present invention is that the projection optical system includes a "second refractive system including a lens having an optical power" on the enlargement side of the reflective optical system.

The presence of the second refractive system facilitates the correction of aberrations and enhances the performance of the projection optical system.

A projection optical system without a second refractive system is described below as a comparative example.

Figure 7:
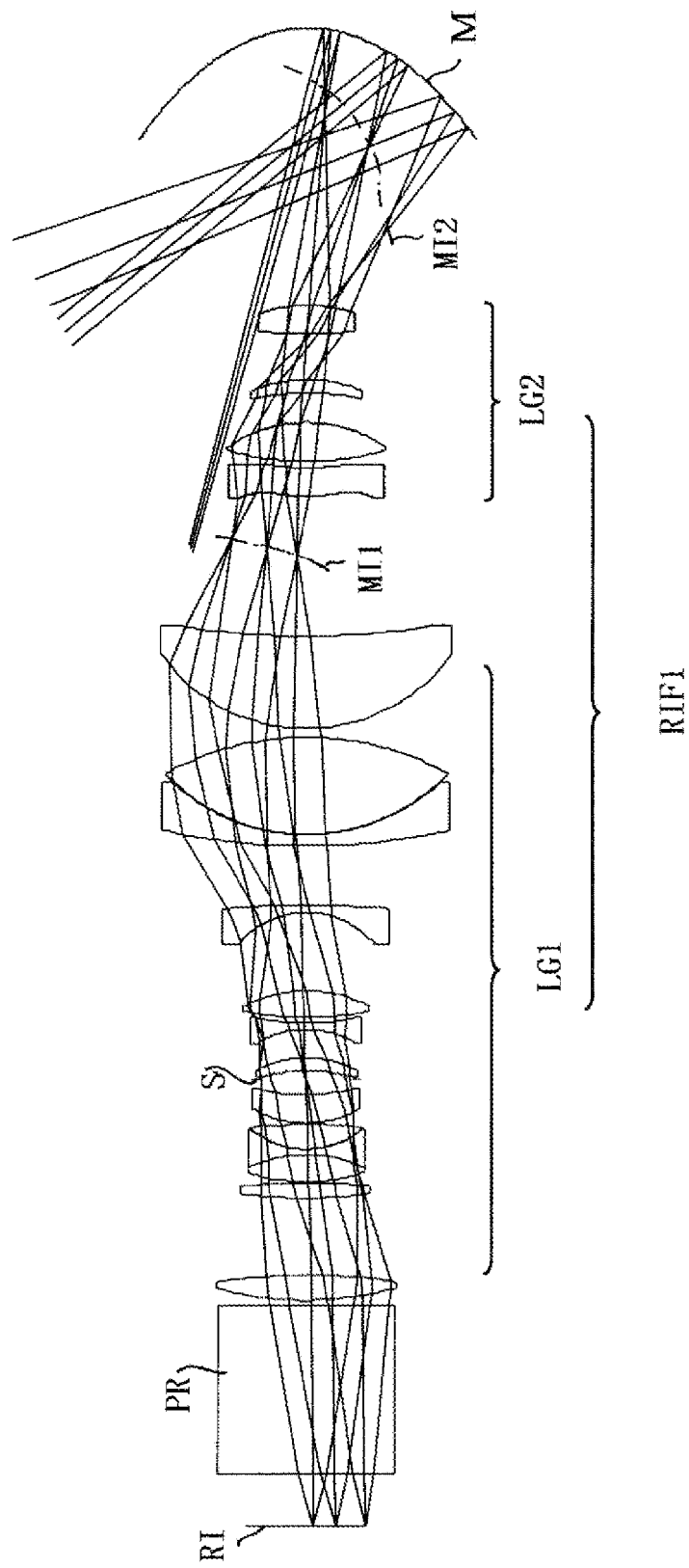
FIG. 7 is a diagram for explaining a lens configuration of a projection optical system according to a comparative example.

FIG. 7 illustrates the lens configuration according to the comparative example, in the same manner as FIGS. 1 to 6. Similar to FIGS. 1 to 6, an "image display surface" denoted by a symbol RI, and a "color composition prism" is denoted by a symbol PR. A "first refractive system" is denoted by a symbol RIF1, and a "mirror" of the reflective optical system is denoted by a symbol M. A "first intermediate image" is denoted by a symbol MI1, and a "second intermediate image" is denoted by a symbol MI2, and an "aperture" is denoted by a symbol S.

The projection optical system of the comparative example is configured by the first refractive system RIF1 and the mirror M of the reflective optical system, and the first refractive system RIF1 is configured by the first lens group LG1 and the second lens group LG2.

Color image light emitted from the color composition prism PR is imaged as a first intermediate image MI1 on the reduction side of the second lens group LG2 by the function of the first lens group LG1, and then enters the second lens group LG2 to image the second intermediate image MI2 on the reduction side of the mirror M.

The color image light that is imaged as the second intermediate image MI2 is reflected by the mirror M and is imaged as a color projection image on a projection surface that is not illustrated.

In this comparative example, in the portion of example 2 illustrated in FIG. 2 excluding the second refractive system, that is, in the first refractive system RIF1 and the mirror M, the lens configuration (the number of lenses included and the lens shapes) is the same in the first lens group LG1 and the second lens group LG2. The first lens group LG1 and the second lens group LG2 are disposed on a common optical axis, as a matter of course.

In the comparative example, the focal length: f, the F-value: Fno, the field angle: ω (unit: degrees), and the back focus: Bf are as follows.
f=4.6, Fno=2.0, ω=69.9, Bf=37.1

FIG. 26 illustrates the data relating to the comparative example in the same manner as FIG. 8 and FIG. 27 illustrates the aspheric surface data relating to the comparative example in the same manner as FIG. 9. The values of the quantities relating to conditions (1) to (6) of the projection optical system according to an embodiment of the present invention, are as follows in the comparative example.
Bf=37.1
f=4.6
LTT=330.7
Yi=12.5
L1D=0.0
MD=71.0
f1-1=-137
f1-2=25.8
"Values of Parameters in Conditional Expression"

The values of parameters in conditions (1) to (6) are as follows.
(1) 8.0
(2) 26.5
(3)
(4) 5.7
(5) 29.6
(6) 5.6

In the comparative example, the parameter of condition (2) exceeds the upper limit of condition (2) and does not satisfy condition (2). Further, there is no second refractive system, and, therefore, there is no condition (3).

Aberration diagrams relating to the projection optical system according to the comparative example are illustrated in FIGS. 28A to 28D, in the same manner as FIGS. 10A to 10D.

As is obvious by comparing the aberration diagrams of the comparative example illustrated in FIGS. 28A to 28D with the aberration diagrams of example 2 illustrated in FIG. 13A to 13D, the spherical aberration (a) and the astigmatic aberration (b) are both well corrected. However, regarding distortion aberration (c) and coma aberration (d), it is evident that the projection optical system of example 2 is significantly improved relative to the projection optical system of the comparative example.

That is, by including the second refractive system, it is evident that the spherical aberration, the astigmatic aberration, the distortion aberration, and the coma aberration are all well corrected in a balanced manner, thereby enhancing the performance of the projection optical system.

With respect to the projection optical system according to an embodiment of the present invention, preferable examples and one comparative example are described as above.

Figure 29:
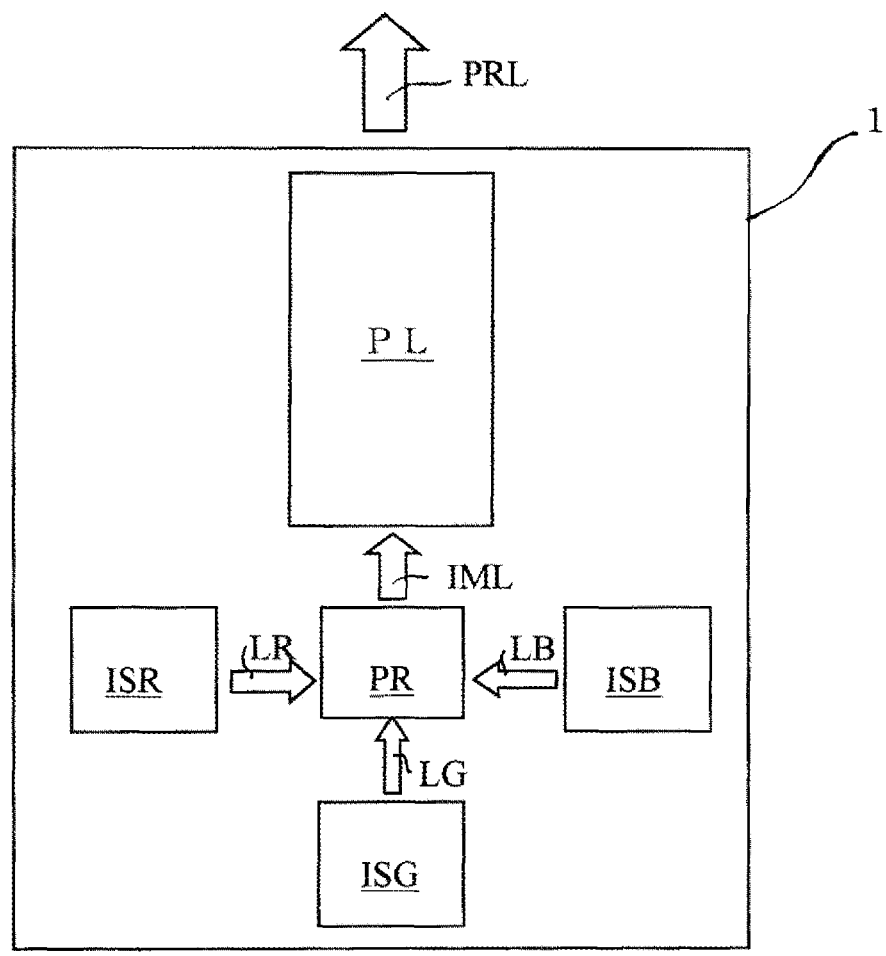
FIG. 29 is a diagram for explaining an image projection apparatus according to an embodiment of the present invention.

FIG. 29 illustrates one embodiment of an image projection apparatus (projector apparatus) using the projection optical system according to an embodiment of the present invention.

Inside a casing 1 of the main body of the projector apparatus, a projection optical system PL, image generating devices ISR, ISB, and ISG using an "image display element" such as a liquid crystal panel, and a color composition prism PR are loaded.

The image generating device ISR displays a "red color component image" of the color image to be projected on the image display surface of the image display element, generates "red color component image light LR", and emits the "red color component image light LR" toward the color composition prism PR.

The image generating device ISG displays a "green color component image" of the color image on the image display surface of the image display element, generates a "green color component image light LG", and emits the "green color component image light LG" toward the color composition prism PR.

The image generating device ISB displays a "blue color component image" of the color image on the image display surface of the image display element, generates a "blue color component image light LB", and emits the "blue color component image light LB" toward the color composition prism PR.

The color composition prism PR combines the red color component image light LR, the green color component image light LG, and the blue color component image light LB into a "color image light IML", and causes the "color image light IML" to enter a projection zoom lens PL.

The projection zoom lens PL projects the incoming color image light IML as a projection imaging light PRL, toward the projection surface (screen) that is not illustrated.

As the projection optical system PL, the above-described projection optical systems, such as those of examples 1 to 6, can be used.

According to one embodiment of the present invention, a new projection optical system can be implemented, in which a first refractive system is disposed on the reduction side and a second refractive system is disposed on the enlargement side, and a reflective optical system is disposed between the first refractive system and the second refractive system.

Although embodiments of the present invention have been described above, the present invention is not limited to the specific embodiments described above, and various variations and modifications can be made within the scope of the claimed invention, unless otherwise specified in the present description.

The effects described in the embodiments of the present invention are merely described as favorable effects arising from the present invention, and the effects of the present invention are not limited to "those described in the embodiments".

What is claimed is:

1. A projection optical system configured to enlarge an image that is displayed on an image display surface of an image display element disposed on a reduction side of the projection optical system, and project the image onto a projection surface disposed on an enlargement side of the projection optical system, the projection optical system comprising:
- a first refractive system, a reflective optical system, and a second refractive system, disposed in a positioning order of the first refractive system followed by the reflective optical system and the reflective optical system followed by the second refractive system in a direction from the reduction side toward the enlargement side, wherein
- the first refractive system includes a first lens group and a second lens group disposed in a positioning order of the first lens group followed by the second lens group in the direction from the reduction side toward the enlargement side,
- the first lens group includes a plurality of lenses, by which a first intermediate image is formed with a light beam emitted from the image display element,
- the second lens group includes at least one lens, by which a second intermediate image is formed with a light beam from the first intermediate image,
- the reflective optical system includes a mirror that has optical power and that is configured to reflect a light beam from the second intermediate image, and
- the second refractive system includes a lens that has optical power and that is configured to refract a light beam reflected by the reflective optical system, wherein
- the projection optical system satisfies a condition (1) as follows:

$1.5 < Bf/f < 25$ in which
- f represents a focal length of an entirety of the projection optical system, and
- Bf represents a back focus obtained by air conversion, wherein the projection optical system satisfies condition (2), as follows:

$5 < LTT/Yi < 25.0$ in which
- LTT represents a length from a reduction side surface of a lens that is closest to the image display surface, to a reflective surface of the mirror, along an optical axis of the lens closest to the image display surface, and
- Yi represents a maximum length from the optical axis of the lens closest to the image display surface to a position within an effective image display range of the image display surface via a center of the effective image display range.

2. The projection optical system according to claim 1, wherein the second refractive system includes a single lens.

3. The projection optical system according to claim 1, wherein all lenses included in the first refractive system, the reflective optical system, and the second refractive system are disposed on an optical axis that is common to all of the lenses.

4. The projection optical system according to claim 3, wherein one lens of the at least one lens included in the second refractive system has an aspheric surface having a shape such that a positive power or a negative power monotonically increases from a lens optical axis of the one lens toward an off axis position.

5. The projection optical system according to claim 3, wherein
the projection optical system satisfies a condition (3), as follows:

$0.8 < L1D/MD < 2.0$ in which
- L1D represents a maximum length in a direction orthogonal to the optical axis from the optical axis in an effective range of an emitting side lens surface of the second refractive system, and
- MD represents a maximum length in the direction orthogonal to the optical axis from the optical axis in an effective range of a reflective surface of the mirror in the reflective optical system.

6. The projection optical system according to claim 3, wherein
the projection optical system satisfies a condition (4), as follows:

$1.5 < MD/Yi < 8.0$ in which
- Yi represents a maximum length from the optical axis of a lens that is closest to the image display surface to a position within an effective image display range of the image display surface via a center of the effective image display range, and
- MD represents a maximum length from the optical axis in an effective range of a reflective surface of the mirror in the reflective optical system.

7. The projection optical system according to claim 1, wherein an aspheric lens is disposed adjacent to the first intermediate image.

8. The projection optical system according to claim 1, wherein the second lens group includes at least one aspheric lens and at least one positive lens.

9. An image projection apparatus comprising:
the projection optical system according to claim 1.

10. A projection optical system configured to enlarge an image that is displayed on an image display surface of an image display element disposed on a reduction side of the projection optical system, and project the image onto a projection surface disposed on an enlargement side of the projection optical system, the projection optical system comprising:
- a first refractive system, a reflective optical system, and a second refractive system, disposed in a positioning order of the first refractive system followed by the reflective optical system and the reflective optical system followed by the second refractive system in a direction from the reduction side toward the enlargement side, wherein
- the first refractive system includes a first lens group and a second lens group disposed in a positioning order of the first lens group followed by the second lens group in the direction from the reduction side toward the enlargement side,
- the first lens group includes a plurality of lenses, by which a first intermediate image is formed with a light beam emitted from the image display element,
- the second lens group includes at least one lens, by which a second intermediate image is formed with a light beam from the first intermediate image,
- the reflective optical system includes a mirror that has optical power and that is configured to reflect a light beam from the second intermediate image, and
- the second refractive system includes a lens that has optical power and that is configured to refract a light beam reflected by the reflective optical system, wherein
- the projection optical system satisfies a condition (1) as follows:

$1.5 < Bf/f < 25$ in which
    f represents a focal length of an entirety of the projection optical system, and
    Bf represents a back focus obtained by air conversion, wherein the projection optical system further satisfies a condition (5), as follows:

$$5.0<|f1-1|/f$$

in which
    f1−1 represents a composite focal length of the first lens group, and
    f represents the focal length of an entirety of the projection optical system.

11. A projection optical system configured to enlarge an image that is displayed on an image display surface of an image display element disposed on a reduction side of the projection optical system, and project the image onto a projection surface disposed on an enlargement side of the projection optical system, the projection optical system comprising:
    a first refractive system, a reflective optical system, and a second refractive system, disposed in a positioning order of the first refractive system followed by the reflective optical system and the reflective optical system followed by the second refractive system in a direction from the reduction side toward the enlargement side, wherein
    the first refractive system includes a first lens group and a second lens group disposed in a positioning order of the first lens group followed by the second lens group in the direction from the reduction side toward the enlargement side,
    the first lens group includes a plurality of lenses, by which a first intermediate image is formed with a light beam emitted from the image display element,
    the second lens group includes at least one lens, by which a second intermediate image is formed with a light beam from the first intermediate image,
    the reflective optical system includes a mirror that has optical power and that is configured to reflect a light beam from the second intermediate image, and
    the second refractive system includes a lens that has optical power and that is configured to refract a light beam reflected by the reflective optical system, wherein
    the projection optical system satisfies a condition (1) as follows:

$$1.5<Bf/f<25$$

in which
    f represents a focal length of an entirety of the projection optical system, and
    Bf represents a back focus obtained by air conversion, wherein the projection optical system further satisfies a condition (6), as follows:

$$1.5<|f1-2|/f<7.0$$

in which
    f1−2 represents a composite focal length of the second lens group,
    f represents the focal length of an entirety of the projection optical system.

* * * * *